(12) United States Patent
Barrera et al.

(10) Patent No.: US 6,341,590 B1
(45) Date of Patent: Jan. 29, 2002

(54) ROTARY ENGINE

(76) Inventors: René Manuel Barrera; René Alejandro Barrera, both of Isla San Marcos #40, Colonia Prado Vallejo Estado de México C.P. (MX), 54170

(*) Notice: Subject to any disclaimer, the term of this patent is extended or adjusted under 35 U.S.C. 154(b) by 0 days.

(21) Appl. No.: 09/560,798

(22) Filed: Apr. 28, 2000

(51) Int. Cl.$^7$ ................................................ F02B 53/00
(52) U.S. Cl. .................... 123/245; 123/248; 418/36; 418/37; 418/35; 192/74
(58) Field of Search ............................... 123/245, 248; 418/36, 37, 35; 192/74

(56) References Cited

U.S. PATENT DOCUMENTS

| | | | | |
|---|---|---|---|---|
| 1,726,461 A | * | 8/1929 | Weed | 123/245 |
| 1,790,534 A | * | 1/1931 | Chevallier | 418/36 |
| 1,973,397 A | * | 9/1934 | Stromberg | 418/36 |
| 2,088,779 A | * | 8/1937 | English | 418/36 |
| 3,186,383 A | | 6/1965 | Potter | 418/35 |
| 3,937,187 A | | 2/1976 | Bergen | 418/36 |
| 3,990,405 A | * | 11/1976 | Kecik | 418/36 |
| 4,035,111 A | | 7/1977 | Cronen, Sr. | 418/38 |
| 4,319,551 A | * | 3/1982 | Rubinshtein | 123/245 |
| 5,046,465 A | * | 9/1991 | Yi | 123/248 |
| 5,199,391 A | * | 4/1993 | Kovalenko | 418/36 |
| 5,242,288 A | | 9/1993 | Vincent | 418/249 |

* cited by examiner

*Primary Examiner*—Thomas Denion
*Assistant Examiner*—Thai-Ba Trieu
(74) *Attorney, Agent, or Firm*—Michael I. Kroll

(57) ABSTRACT

A rotary engine including a static toroidal cavity having an inlet port for introducing fuel and air to the cavity and an outlet port for exhausting products of combustion from the cavity. A first power train including a first output shaft and a second power train including a second output shaft are located partially within the cavity and able to rotate in the first direction. A plurality of pistons are positioned around a perimeter of the toroidal cavity and between the first and second power trains. The plurality of pistons are movable with respect to the cavity and include a first set of pistons connected to rotate with the first power train and a second set of pistons connected to rotate with the second power train. The plurality of pistons defining a plurality of chambers therebetween. Combustion of a fuel air mixture within a first one of the plurality of chambers causes a fuel gas mixture to be introduced into a second one of said plurality of chambers through the intake port, combustion material to be exhausted from a third one of the plurality of chambers and one of the first and second drive trains to rotate in the first direction. A subsequent combustion of a fuel air mixture in one of the plurality of chambers causes the other of the first and second drive trains to rotate in the first direction, the first and second drive trains alternating movement upon subsequent combustions.

13 Claims, 20 Drawing Sheets

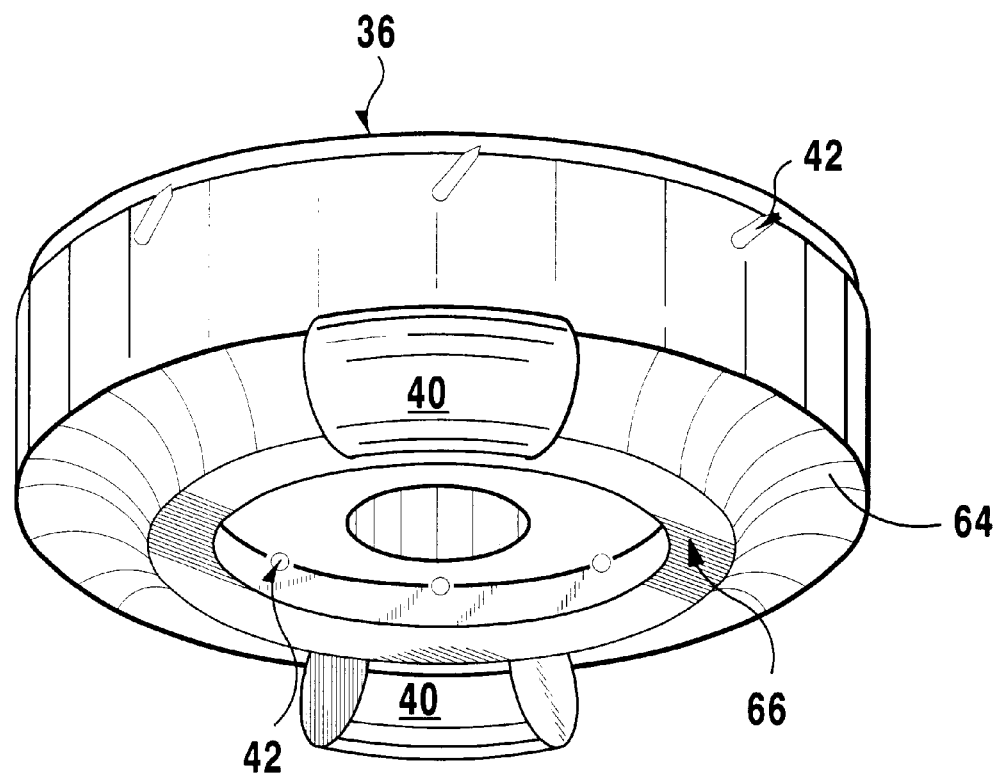
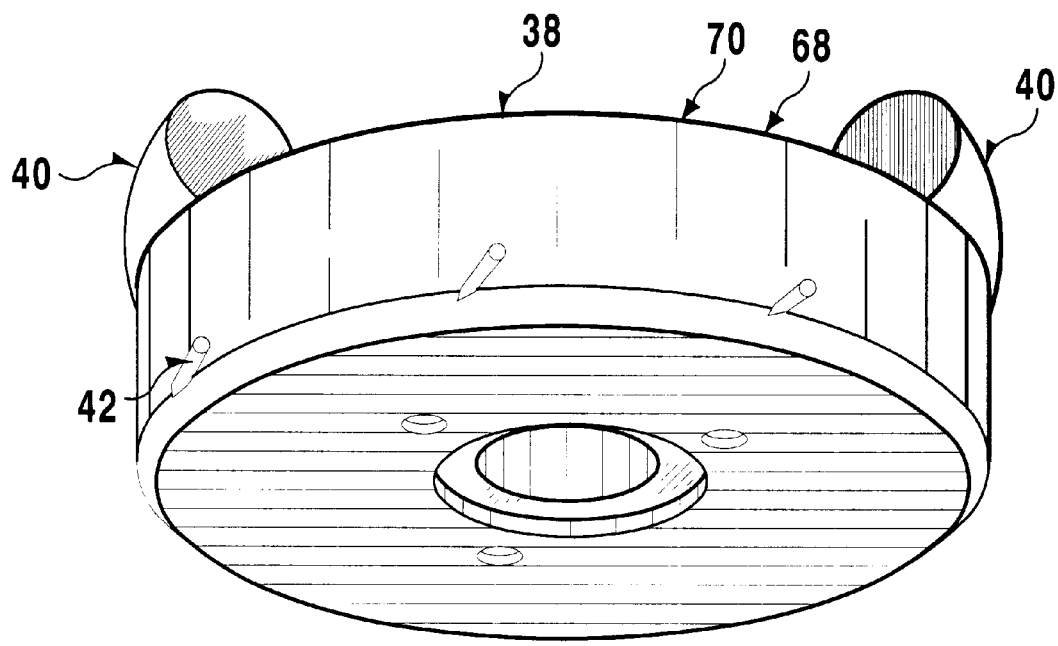
FIG 4

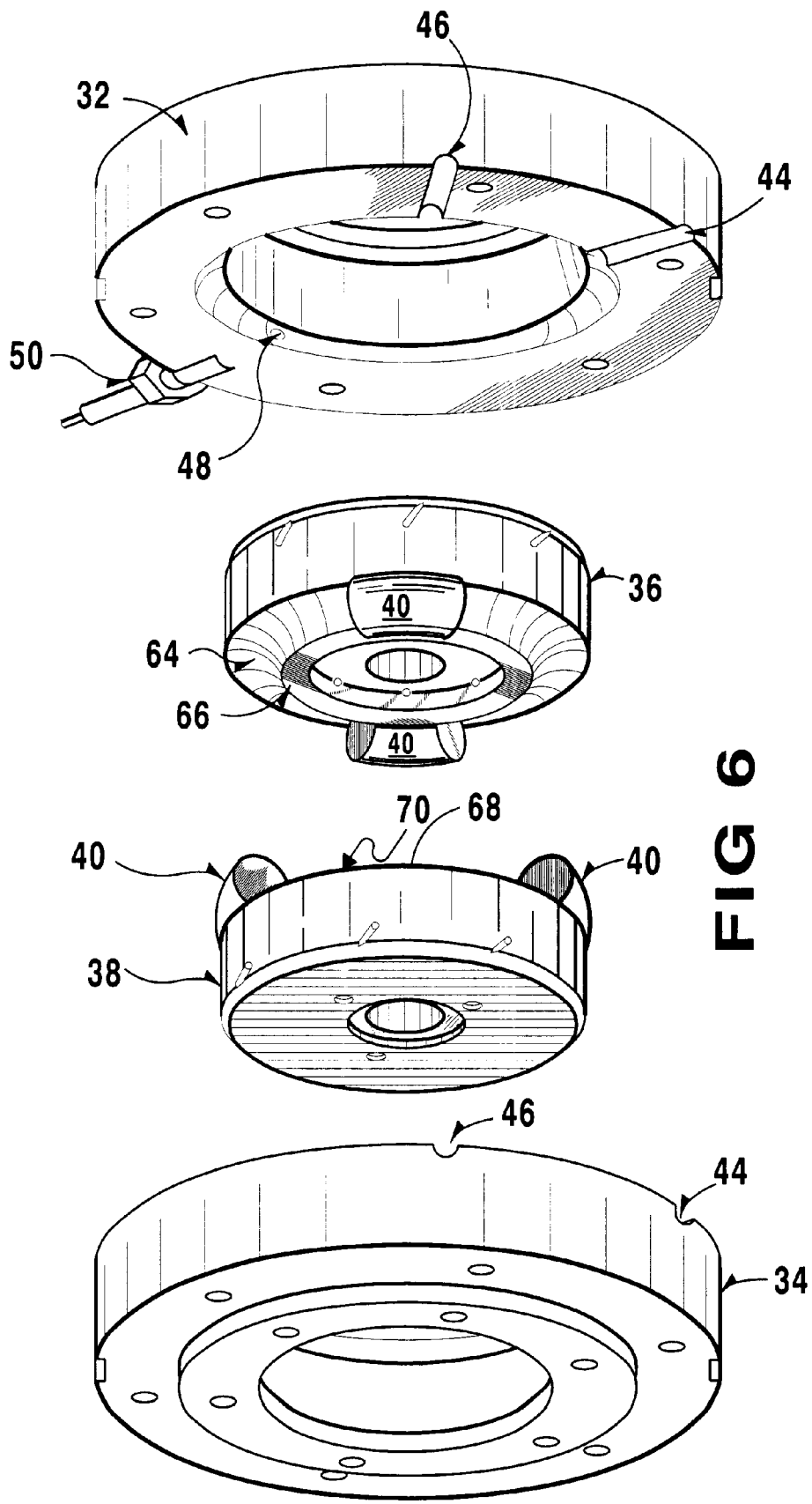

ROTARY ENGINE

BACKGROUND OF THE INVENTION

1. Field of the Invention

The present invention relates generally to internal-intermittent-combustion engines, and, more specifically, to a sequential rotary piston engine.

2. Description of the Prior Art

Heat engines are classified as the external-combustion type (the working fluid is entirely separated from the fuel-air mixture, and heat from the products of combustion are transferred through the walls of a containing vessel or boiler), and the internal-combustion type in which the working fluid consists of the products of combustion of the fuel-air mixture itself. Nowadays, the reciprocating internal-combustion engine and the steam turbine are by far the most used types of heat engines with the gas turbine in wide use only for high-speed aircraft.

Fundamental advantages of the reciprocating internal-combustion engine over power plants of other types are the absence of heat exchangers in the working fluid stream, the parts of the internal-combustion engine can work at temperatures well below the maximum cyclic temperature, a lower ratio of power-plant weight and bulk to maximum output (possibly except in the case of units of more than 10,000 hp), mechanical simplicity, and the cooling system handles a small quantity of heat.

The advantages of the reciprocating internal-combustion engine are of special importance in the field of land transportation, where small weight and bulk of the engine and fuel are always essential. In our present civilization the number of units and the total rated power of internal-combustion engines in use is far greater than that of all other prime movers combined.

The reciprocating internal-combustion engine dates back to 1876 when the German engine pioneer, Nikolaus Otto, developed the spark-ignition engine, and 1892 when Diesel invented the compression-ignition engine. Since then, engines have experienced a continuous development as our knowledge of the engine process has increased, as new technologies appeared and as the demand for new types of engines arose.

Usually, in a intermittent internal-combustion engine, a major moving part, called a piston, slides backwards and forwards in a straight line, inside a cylindrical cavity called cylinder. Such movement causes a volume variation of the cavity formed by the piston and the cylinder, that is used to perform a two or a four-stroke cycle.

An alternative to the design of linear-reciprocating-internal-combustion engine is the rotary design. The advantages of rotary over reciprocating action are primarily a matter of compactness, geometry, weight and cost of manu-facturing.

Even before Otto's 119-year-old idea got its first positive results, some ideas like the Pump of Ramelli were developed. (Ramelli's Pump, developed in the sixteenth century, is the oldest reference to this type of rotary machines). Many engines of this category have been built, but the only one that has been developed to the point of quantity production is the Wankel (used in a line of sports-type cars by Mazda of Japan), where a rotating member is arranged to vary the working volume by an eccentric motion within a non-circular space. The most difficult problem with this engine is that of sealing the combustion chamber against leakage without excessive friction and wear. This problem is far more difficult than that with conventional piston rings as a "line of contact" instead of a surface of contact is usually involved and the surfaces to be sealed are discontinuous, with sharp corners. The Wankel engine is indeed smaller and lighter and has less vibration than conventional engines of the same output. There is no evidence that it is cheaper to produce. The sealing problem seems to have been solved as far as reasonable durability is concerned, but there is evidence of considerable leakage. This defect and the attenuated shape of the combustion chamber are responsible for poor fuel economy as compared with the equivalent conventional engine.

The idea of engines which toroidal pistons rotate or reciprocate within toroidal cylinders has also been advanced (like the Scott's Omega engine in the 1960's, where pistons reciprocate in a toroidal cylinder by means of a complex arrangement of cranks and shafts). The difficulties of connecting such pistons to the output shaft by a simple and reliable mechanism, together with the problem of sealing the sliding surfaces involved, caused the abandonment of such ideas.

Examples of such rotary engines are provided in the prior art. For example, U.S. Pat. Nos. 3,186,383; 3,937,187; 4,035,111 and 5,242,288 all are illustrative of such prior art. While these units may be suitable for the particular purpose to which they address, they would not be as suitable for the purposes of the present invention as heretofore described. Furthermore, whatever the merits, features and advantages of the above cited references, none of them achieve or fulfill the purposes of the Sequential Rotary Piston Engine (S.R.P.E.) of the present invention.

Inventor: Martin Cordingley Potter

Issued: Jun. 1, 1965

This invention concerns internal combustion engines and more particularly relates to rotary engines. This invention includes an output shaft, a body member mounted for rotation about the axis of the shaft, a plurality of annular cavities within the body member having a center of curvature on the rotational axis of the body member, an arcuate piston in each cavity, connector means secured to the pistons transmitting motion of the pistons to the output shaft, inlet means in the chambers whereby fuel may be applied to the combustion chambers between the pistons and end faces of the cavities, means for removing burnt gases from the chambers, first unidirectional clutch means between the body member and a fixed support, second unidirectional clutch means between the connector means and a fixed support, third unidirectional clutch means between the body member and the output shaft, fourth unidirectional clutch means between the connector means and the output shaft, the first and second unidirectional clutch means preventing motion of the body member and connector means relative to the fixed support in the reverse sense of the output shaft, the third and fourth clutch means allowing overrun of the output shaft relative to the body member or connector means.

U.S. Patent Number 3,937,187

Inventor: Henry Bergen

Issued: Feb. 10, 1976

A toroidal cylinder is provided with a slot formed around the inner wall. A central shaft carries a sun wheel engaging a set of planet gears which in turn engage a fixed ring gear secured to the cylinder adjacent the slot. A pair of rings are provided carrying sets of pistons running within the cylinder, the edges of the rings sealably running within the slot. Pins on the planet gears engage slotted arms secured to the rings so that opposite pairs of pistons move toward and away from one another in sequence thus providing compression and expansion strokes in the cylinder together with intake and exhaust strokes. A fuel mixture ignited by spark plugs or the like may be used or, alternatively, fuel injection may be utilized and inlet and exhaust ports are formed within the walls of the toroidal cylinder.

U.S. Patent Number 4,035,111

Inventor: Peter J. Cronen, Sr.

Issued: Jul. 12, 1977

A rotary engine having a toroidal chamber which is stationary, and in which the pistons convey power to a common crankshaft under the control of a four-bar linkage including novel means for preventing reverse motion of any piston in the chamber. Inlet and exhaust valves to control the flow of energizing fluid are provided, and are actuated directly from the crankshaft. Novel sub-components include the four-bar linkage, the valve mechanism, and the arrangement by which rotary movement of the pistons in the chamber is eliminated.

U.S. Patent Number 5,242,288

Inventor: Ogden W. Vincent

Issued: Sep. 7, 1993

An engine or pump is described which has a round cylinder in cross section, the surface of the cylinder being a round toroidal tube in the rotary direction. Fhe cylinder is made of two equal parts, one part fixed and one part rotating with each part meeting on a flat surface at a right angle to the drive shaft. Force exerted axially against the rotating cylinder where the two parts meet on the flat surface. The spring diaphragm is pre-loaded by a thrust bearing in a pre-loading disk to apply force to the rotating part of the cylinder. Within the cylinder are one or more round toroidal section pistons that are attached to the rotating part of the cylinder by piston pins. A hinged internal cylinder abutment is actuated by the piston as the piston passes through the abutment section. Working fluid to the cylinder is controlled by an internal valve actuated by a cam-disk on the drive shaft.

SUMMARY OF THE PRESENT INVENTION

The present invention relates generally to internal-intermittent-combustion engines, and, more specifically, to toroidal rotary engines.

A primary object of the present invention is to provide a toroidal rotary engine that will overcome the shortcomings of prior art devices.

Another object of the present invention is to provide a toroidal rotary engine which is smaller, lighter, more completely free of vibration, cheaper, and mechanically simpler than the reciprocating linear internal-combustion engine.

A further object of the present invention is to provide a toroidal rotary engine including a simple control mechanism, an acceptable sealing of the sliding surfaces involved, and a reliable and simple connection between the toroidal pistons and output shaft.

A yet further object of the present invention is to provide a toroidal rotary engine that allows the fitness of a two or a four-stroke cycle with a spark-ignition or a compression-ignition system.

Another object of the present invention is to provide a toroidal rotary engine that is simple and easy to use.

A still further object of the present invention is to provide a toroidal rotary engine that is economical in cost to manufacture.

The foregoing and other objects are achieved by placing an even number of toroidal pistons (of identical size) into a closed toroidal cavity. The entire toroidal cavity is divided into smaller cavities or chambers according to the chosen even number of toroidal pistons (the size of the pistons are designed to fit into the toroidal cavity in order to provide a sealing action of the resulting cavities in relationship with their adjacent ones), and the actual working volume of the engine is the volume of the whole toroidal cavity less the volume occupied by the chosen even number of toroidal pistons. The toroidal pistons are arranged in two identical groups. Each of the two identical groups comprises one half of the even number of toroidal pistons placed symmetrically around the 360° of the toroidal axis and connected to each other by a rigid connecting structure. The toroidal pistons belonging to one of the two identical groups are caused to move with solidarity as they are attached to the connecting rigid structure. This implies that when both groups are placed inside the toroidal cavity, the toroidal cavity is divided into an even number of smaller cavities or chambers equal to the chosen even number of toroidal pistons. Specific static areas of the entire static toroidal cavity are chosen to perform a specific action of the selected cycle of the engine (like the intake and the exhaust areas). If one of the two identical rigid symmetrical groups of toroidal pistons remains static by the action of a simple control mechanism in a specific place of the toroidal cavity, while the other one rotates inside the entire toroidal cavity (the movement caused by the pressure changes within the cavities or chambers of the engine due to burning the selected mixture of air and fuel), the toroidal cavities, formed by the placing of the two groups of toroidal pistons inside the entire toroidal cavity, experience a volume variation (half of the total even number of toroidal cavities will increase their volume and, obviously, the remaining cavities will diminish their volume). A relation of design is established between the maximum and minimum allowed volume for the toroidal cavities (it is also performed by the control mechanism). The motion of the free group starts when the relation of volumes is in the maximum for half of the toroidal cavities while, of course, in the minimum for the other half of toroidal cavities and, the position of the toroidal pistons and toroidal cavities matches with the position of the specific zones of the entire toroidal cavity in order to perform a cycle.

The moving group of toroidal pistons moves into the entire toroidal cavity until the toroidal cavities that were at the allowed maximum volume at the beginning of the motion diminish their volume to the established minimum. This implies that the toroidal cavities that were at the allowed minimum volume at the beginning of the motion, now are at the established maximum volume. After reaching this point, the control mechanism allows both groups of toroidal pistons to move together (which implies that there is no volume change in the toroidal cavities), performing a replacement action, (this means that all the toroidal pistons and all the toroidal cavities move in order to match with the static areas of the toroidal cavity to perform a new cycle).

Now, the group that was static in the previous cycle moves, while the group of toroidal pistons that was in motion in the previous cycle is static. The volume variations in the toroidal cavities are used to fix and perform a selected cycle (a two-stroke-cycle or a four-stroke-cycle). The groups of toroidal pistons describe a non-reciprocating sequential rotary motion. These two symmetrical groups of toroidal pistons are connected to two output shafts which movement is rectified by any known means in order to obtain a continuous non-sequential rotary motion.

The even number of toroidal pistons, the size of them, as well as the chosen cycle, depend on many design criteria, but the total number of toroidal pistons to be used is:

for two-stroke-cycle:
$P=2n$, where $n=1,2,3,4\ldots$
for four-stroke-cycle:
$P=2^n$, where $n=2,3,4\ldots$
where P is the even number of toroidal pistons (equal to the number of chambers) to be used by the S.R.P.E.

Due to the fact that in the four-stroke-cycle the number of different strokes is 4 (intake, compression, power and exhaust strokes) the number of cavities formed by placing the even number of toroidal pistons inside the entire toroid must be a multiple of 4, and for the two-stroke-cycle case, the even number of cavities to be used must be multiple of 2 (compression and power strokes).

The reasoning behind these formulas will become apparent from the following detailed description.

It is to be understood that both the foregoing general description and the following detailed description are exemplary and explanatory only and are not restrictive of the invention as claimed.

The features and advantages of the present invention will become apparent from the following detailed description of a preferred embodiment of the invention, when read in connection with the accompanying drawings.

The accompanying drawings, which are incorporated in and constitute part of the specification, illustrate one embodiment of the invention and together with the description, serve to explain the principles of the invention.

It should be noticed that the set of drawings includes all normal functions required in a complete internal combustion engine, this is, combustion chambers, pistons shafts to transmit the so created motion as well as a timing mechanism to coordinate it among the different parts of the machine. All starter, ignition and fueling systems can be accommodated by the common practices related herein.

Additional objects of the present invention will appear as the description proceeds.

A rotary engine including a static toroidal cavity having an inlet port for introducing fuel and air to the cavity and an outlet port for exhausting products of combustion from the cavity is disclosed by the present invention. A first power train including a first output shaft and a second power train including a second output shaft are located partially within the cavity and able to rotate in the first direction. A plurality of pistons are positioned around a perimeter of the toroidal cavity and between the first and second power trains. The plurality of pistons are movable with respect to the cavity and include a first set of pistons connected to rotate with the first power train and a second set of pistons connected to rotate with the second power train. The plurality of pistons defining a plurality of chambers therebetween. Combustion of a fuel air mixture within a first one of the plurality of chambers causes a fuel gas mixture to be introduced into a second one of said plurality of chambers through the intake port, combustion material to be exhausted from a third one of the plurality of chambers and one of the first and second drive trains to rotate in the first direction. A subsequent combustion of a fuel air mixture in one of the plurality of chambers causes the other of the first and second drive trains to rotate in the first direction, the first and second drive trains alternating movement upon subsequent combustions.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 4 is an exploded view of the toroidal rotary engine of the present invention taken in the direction of the arrow labeled 4 in FIG. 3;

FIG. 6 is an exploded view of the rotating and stationary members members of the toroidal rotary engine of the present invention taken in the direction of the arrow labeled 6 in FIG. 5;

DETAILED DESCRIPTION OF THE PREFERRED EMBODIMENT

Figure 1:
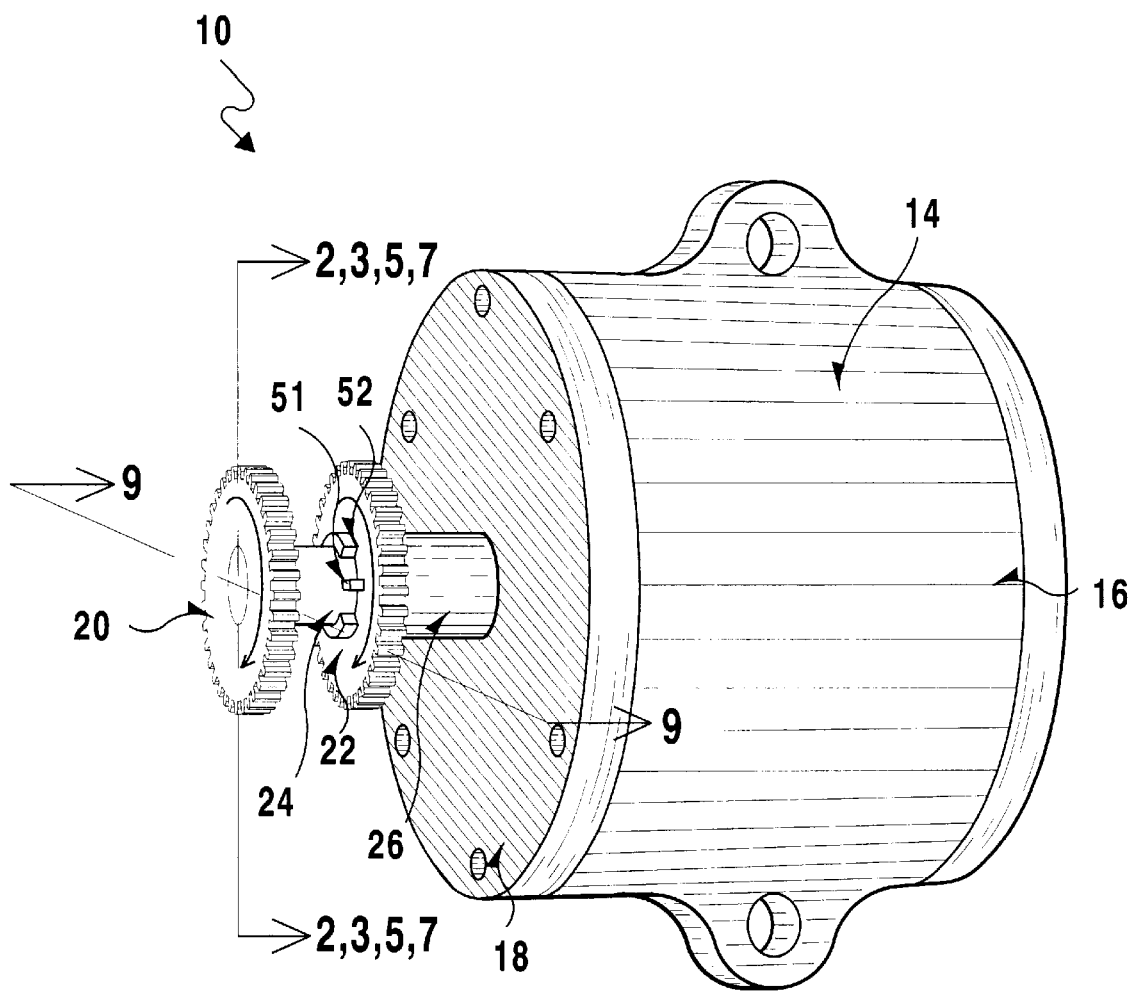
FIG. 1 is a front perspective view of the toroidal rotary engine of the present invention.

Turning now descriptively to the drawings, in which similar reference characters denote similar elements throughout the several views, FIGS. 1 through 15A illustrate the rotary engine of the present invention indicated generally by the numeral 10.

A perspective view of the rotary engine 10 is shown in FIG. 1. The rotary engine 10 includes a housing 14 having a lower covering 16 and an upper covering 18 for housing the static and sequential moving structures of the rotary engine 10. Extending from the housing 14 and through the upper covering 18 are an internal output shaft 24 and an external output shaft 26. The internal output shaft 24 extends through the external output shaft 26. The length of the internal output shaft 24 is greater than the length of the external output shaft 26 such that the internal output shaft 24 extends on either side of the external output shaft 26 when positioned to extend therethrough. The internal output shaft 24 includes an upper external gear 20 connected to an end thereof. A non-backward angular stop 51 extends from a side of the internal output shaft 24. A lower external gear 22 is positioned at an end of the external output shaft 26 and an angular stop 52 is connected to the lower external gear 22. The lower external gear 22 is positioned between the upper external gear 20 and the upper cover 18 of the housing 14.

While a preferred structure for the angular stops is shown and described herein, those of ordinary skill in the art who have read this description will appreciate that there are numerous other structures for the angular stops and, therefore, as used herein the phrase "means for stopping movement of the first and second drive trains" should be construed as including all such structures as long as they achieve the desired result of stopping movement of the first and second drive trains, and therefore, that all such alternative mechanisms are to be considered as equivalent to the one described herein.

Figure 2:
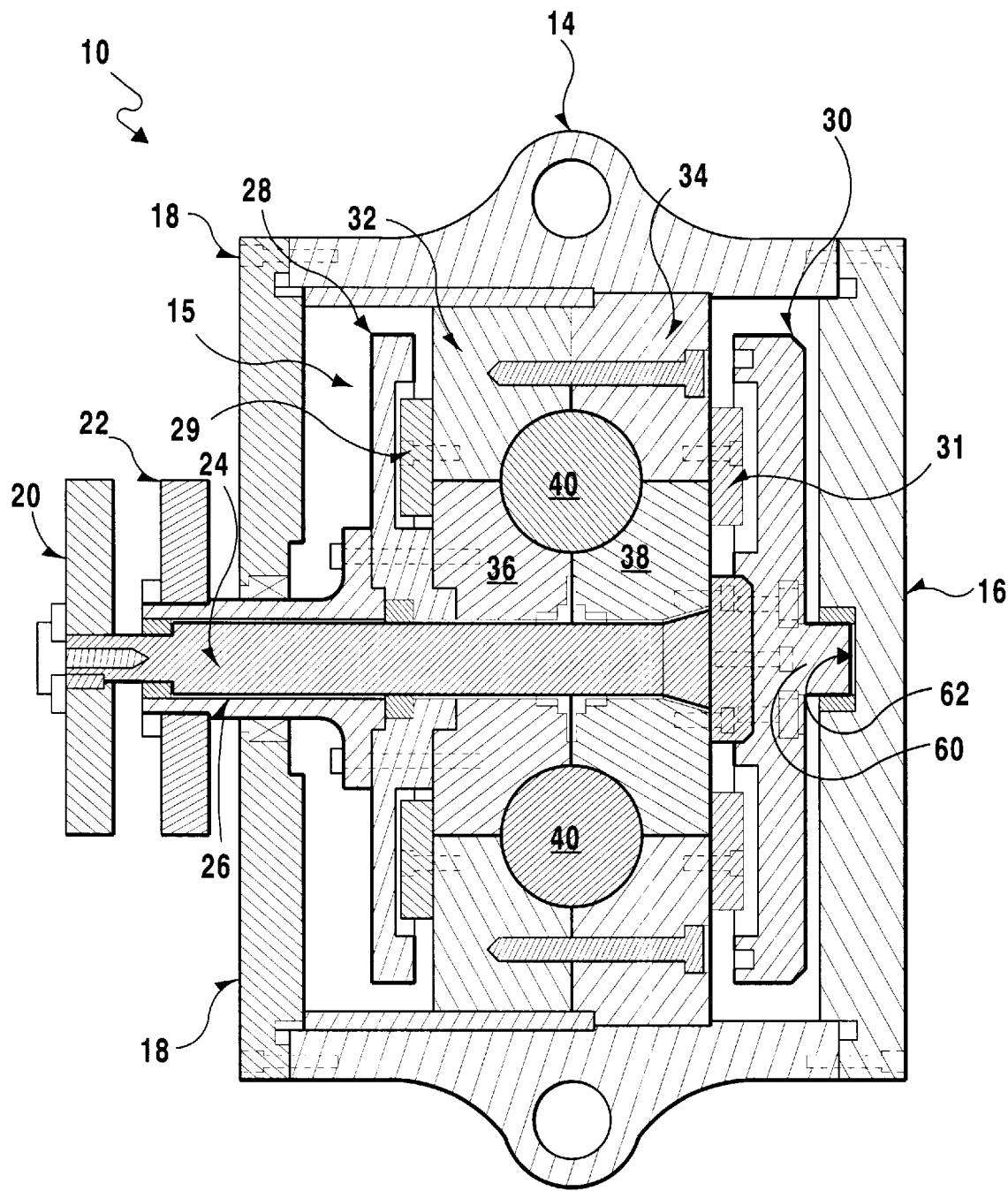
FIG. 2 is a cross-sectional view of the toroidal rotary engine of the present invention taken along the line 2—2 of FIG. 1, illustrating the toroidal cavity housing and one shaft contained within another.

A cross-sectional view of the rotary engine 10 taken along the line 2—2 of FIG. 1 is illustrated in FIG. 2. As can be seen from this figure, the housing 14 forms a cavity 15. The external output shaft 26 extends partially into the cavity 15 wherein it is secured to a dynamic upper non-backward mechanism 28. The internal output shaft 24 extends fully into the housing 14 wherein it is secured to a dynamic lower non-backward mechanism 30. The internal output shaft 24 extends through and on either side of the external output shaft 26. Positioned between the dynamic upper non-backward mechanism 28 and the dynamic lower non-backward mechanism 30 are upper and lower center rotating members 36 and 38, respectively. The lower center rotating member 38 connects to rotate with the internal output shaft 24 to form a first power train. The lower center rotating member 38 is received within a lower outer stationary member 34 and a lower axial holder and rotary sliding face 31 is connected to the lower outer stationary member 34 and positioned between the lower outer stationary member 34 and the dynamic lower non-backward mechanism 30. The upper center rotating member 36 connects to rotate with the external output shaft 26 to form a second power train. The upper center rotating member 36 is received within an upper outer stationary member 32 and an upper axial holder and rotary sliding face 29 is connected to the upper outer stationary member 32 and positioned between the upper outer stationary member 32 and the dynamic upper non-backward mechanism 28.

Figure 7:
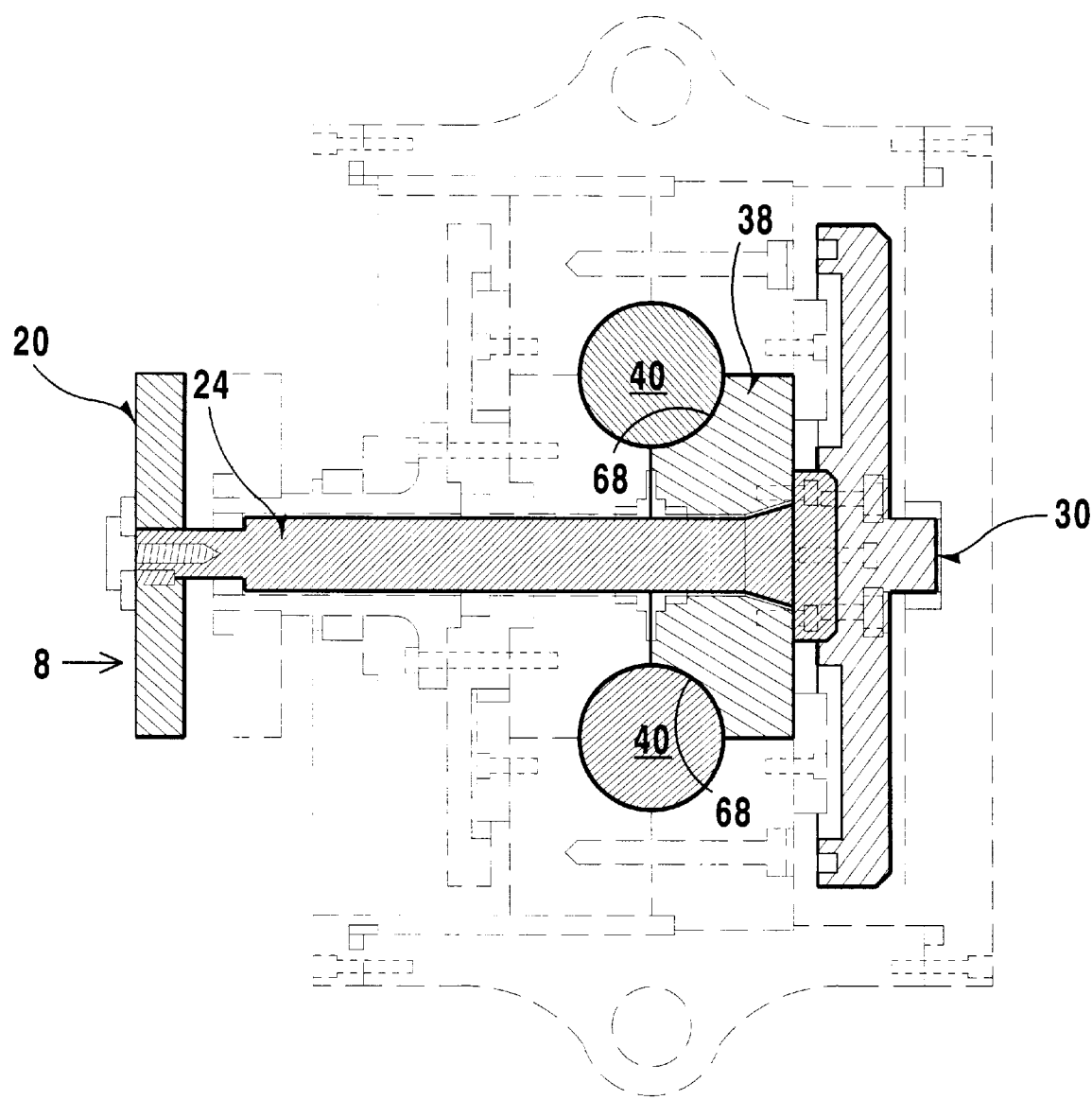
FIG. 7 is a cross-sectional view of the toroidal rotary engine of the present invention taken along the line 7—7 of FIG. 1, showing the connections of the upper external gear and internal output shaft.
Figure 8:
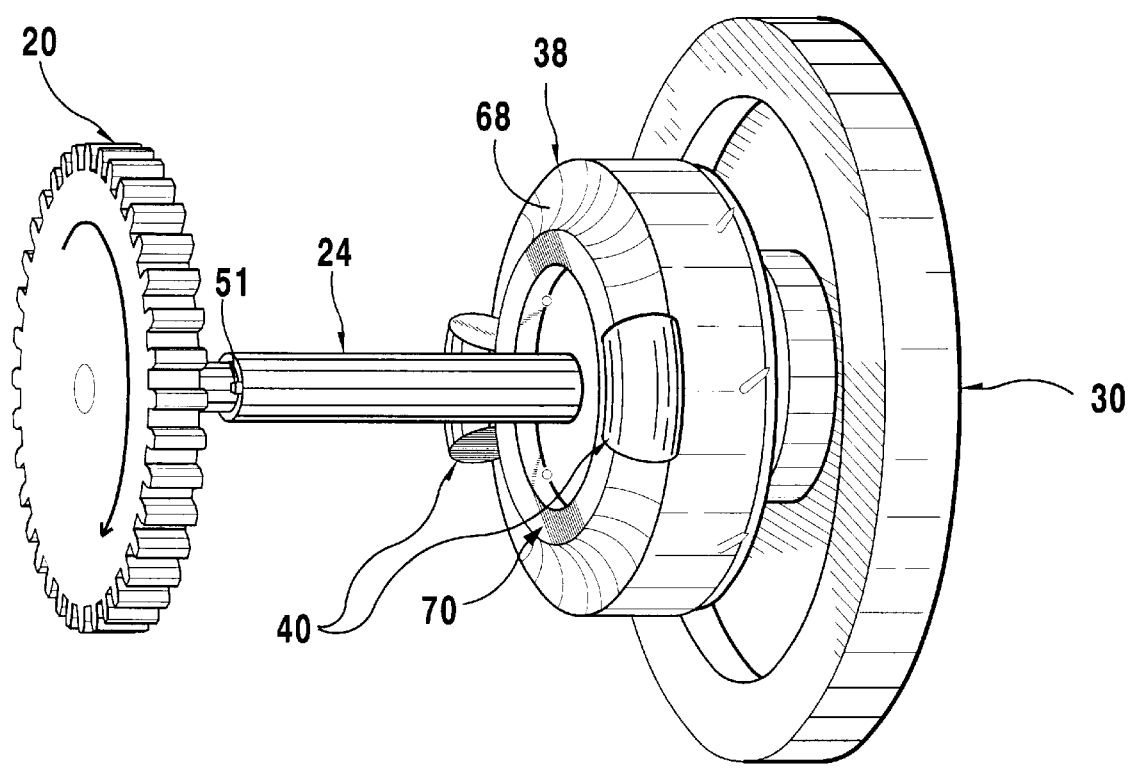
FIG. 8 is a front perspective view of the first power train of the toroidal rotary engine of the present invention taken in the direction of the arrow labeled 8 in FIG. 7.

The first power train is clearly illustrated in FIGS. 7 and 8 and includes the lower center rotating member 38 connected to first and second toroidal pistons 40, the first and second toroidal pistons 40 being positioned on opposing sides of the lower center rotating member 38. The lower center rotating member 38 is connected to rotate with the internal output shaft 24, upper external gear 20, internal shaft angular stop 51 and the dynamic lower non-backward mechanism 30. The dynamic lower non-backward mechanism 30 includes a protrusion on a side opposite the connection with the internal output shaft 24. The protrusion 60 is received in a recess 62 in the lower cover 16 of the housing 14 for retaining the first power train in position within the housing 14. The internal output shaft 24 is secured to the lower center rotating member 38 for rotation therewith. The upper external gear 20 and internal shaft angular stop 51 are connected to the internal output shaft 24 and thus also rotate with the lower center rotating member 38. The lower center rotating member 38 includes a groove 68 extending around a periphery of its top side 70 for receiving the first and second toroidal pistons 40.

Figure 9:
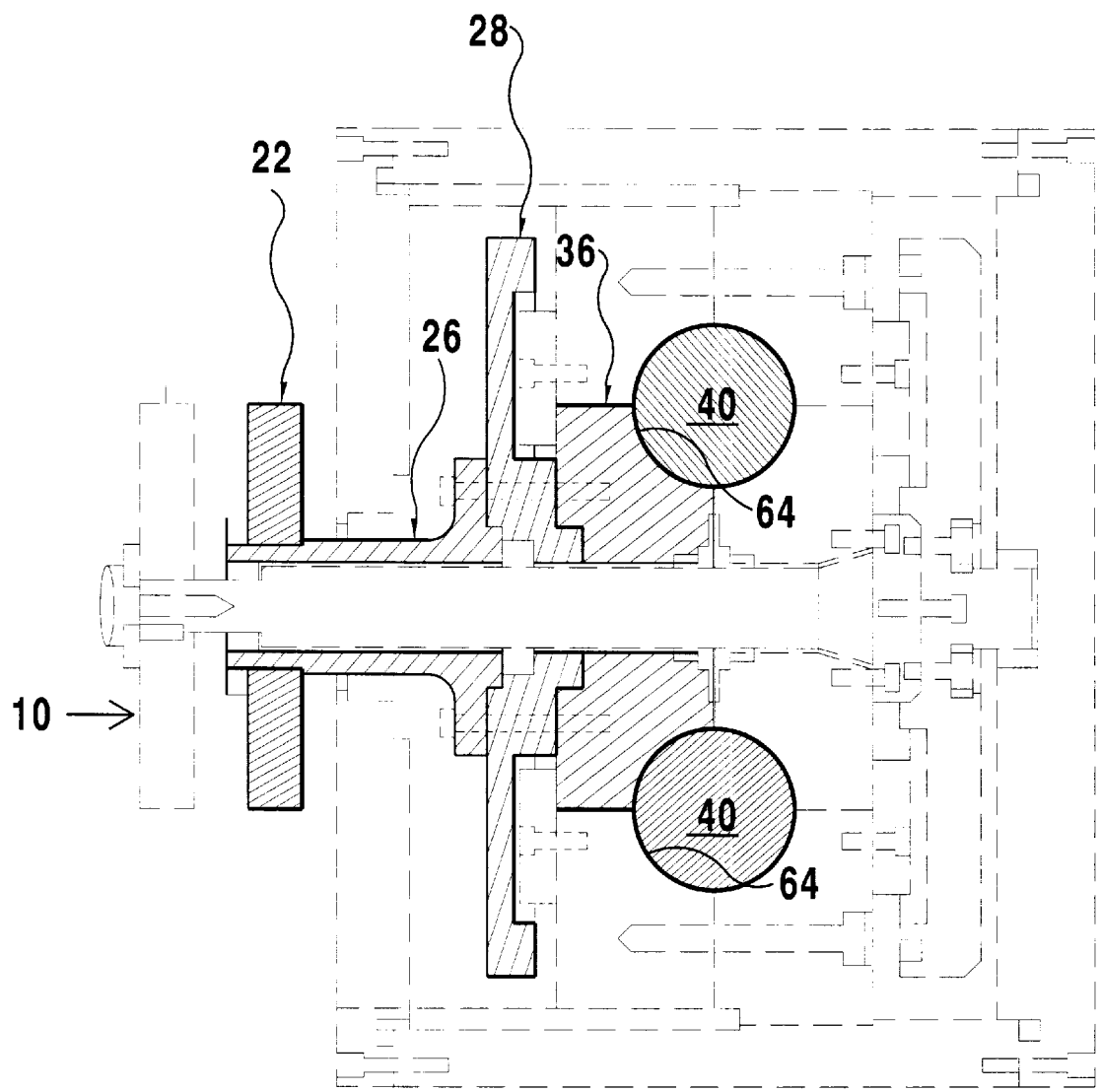
FIG. 9 is cross-sectional view of the toroidal rotary engine of the present invention taken along the line 9—9 of FIG. 1 illustrating the lower external gear attached to the outer shaft and two pistons attached to the upper center rotating member.
Figure 10:
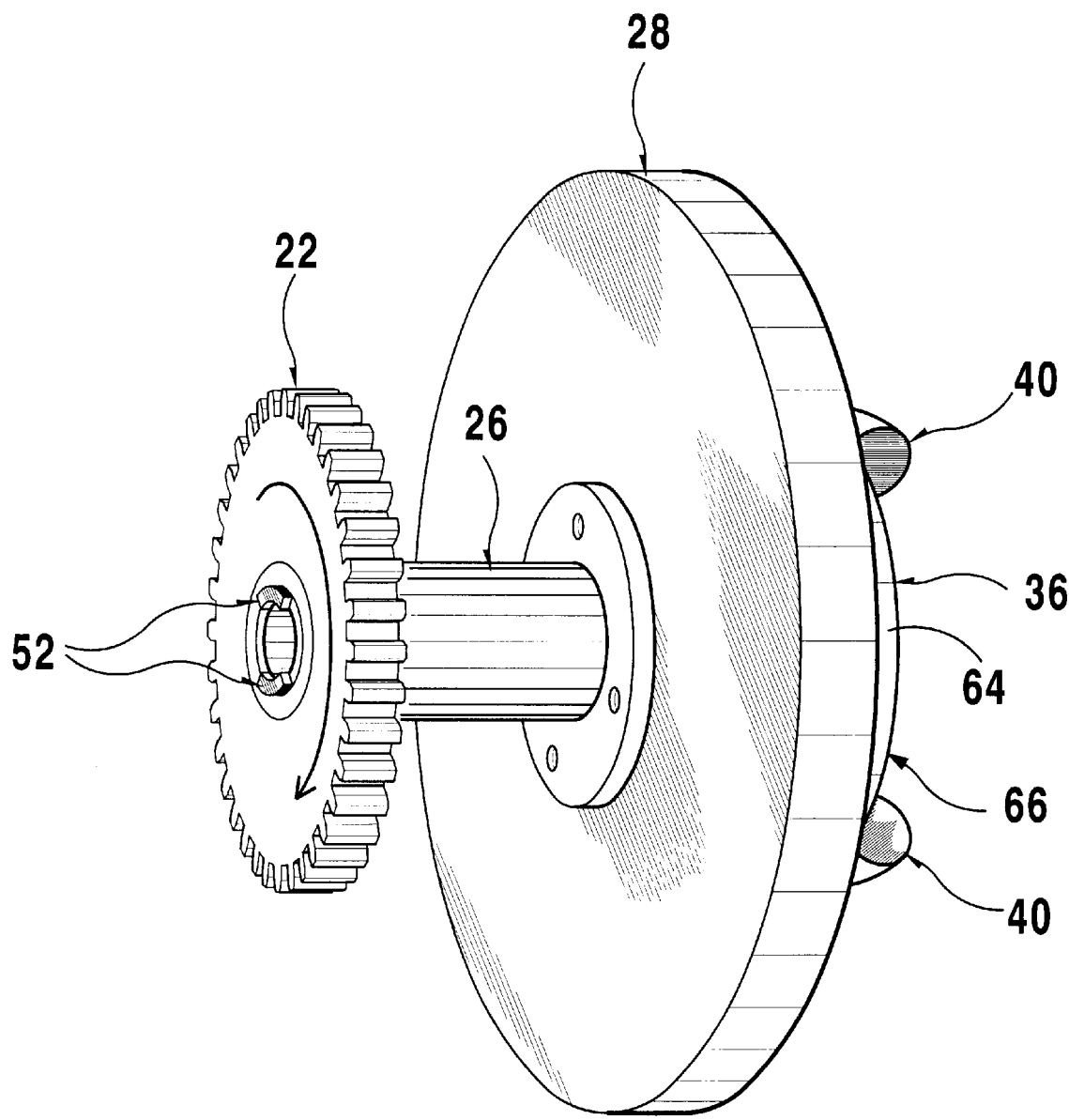
FIG. 10 is a front perspective view of the second power train of the toroidal rotary engine of the present invention taken in the direction of the arrow labeled 10 of FIG. 9.

The second power train is clearly illustrated in FIGS. 9 and 10 and includes an upper center rotating member 36 connected to third and fourth toroidal pistons 40, the third and fourth toroidal pistons 40 being positioned on opposing sides of the upper center rotating member 36 and between the first and second toroidal pistons 40. The upper center rotating member 36 is connected to rotate with the external output shaft 26, lower external gear 22, external shaft angular stop 52 and dynamic upper non-backward mechanism 28. The external output shaft 26 is secured to the upper center rotating member 36 and rotates therewith. The lower external gear 22 and external shaft angular stop 52 are connected to the external output shaft 26 and thus also rotate with the upper center rotating member 36. The upper center rotating member 36 includes a groove 64 extending around a periphery of its bottom side 66 for receiving the third and fourth pistons 40. The first and second power trains form first and second rigid structures. The lower center rotating member 38 is received within the lower outer stationary member 34 and the upper center rotating member 36 is received within the upper outer stationary member 32.

Figure 3:
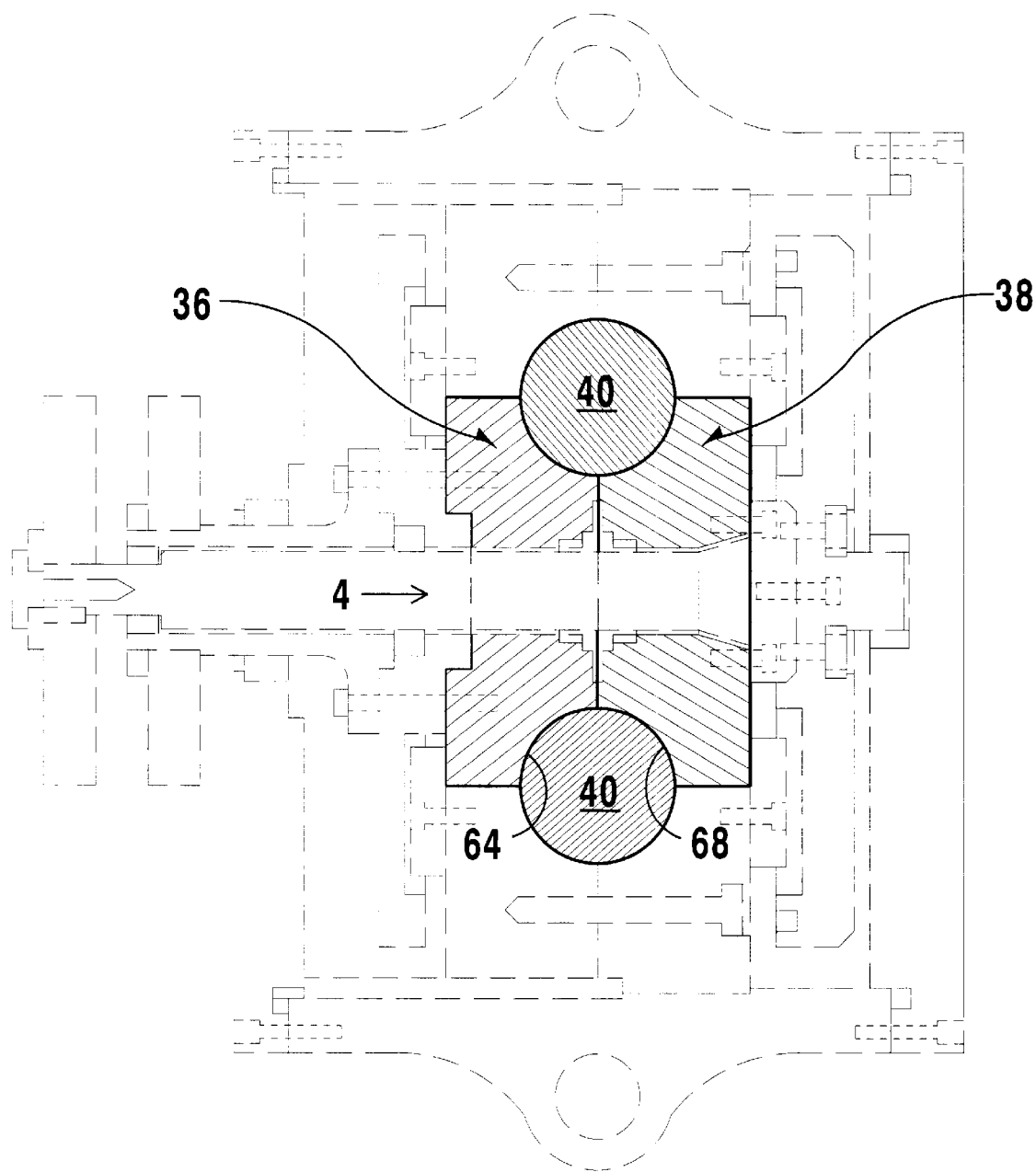
FIG. 3 is a cross-sectional view of the toroidal rotary engine of the present invention taken along the line 3—3 of FIG. 1, illustrating the rotating center members forming ½ the toroidal cavity, all other elements being in dashed lines.

The positioning of the upper and lower center rotating members 36 and 38 is illustrated in FIGS. 3 and 4. FIG. 3 is a cross-sectional view taken along the line 3—3 of FIG. 1 illustrating the remainder of the toroidal rotary engine 10 in dashed lines. As can be seen from these figures, the groove 64 extending around the upper center rotating member 36 is aligned with the groove 68 extending around the lower center rotating member 38 for receiving the first, second, third and fourth pistons therein. The first, second, third and fourth pistons 40 are positioned around the grooves 64 and 68 and separated by substantially 90°. Also extending through a side wall of both the upper and lower center rotating members 36 and 38 are lubrication veins 42 for lubricating the grooves thereby allowing the pistons 40 to slide therein.

FIG. 6 illustrates an exploded view of the rotating and stationary members positioned within the cavity 15. The positioning of the first, second, third and fourth toroidal pistons 40 is also clearly seen from this view. A recess is provided extending through each of the upper outer stationary shaft 32, the upper center rotating member 36, the lower center rotating member 38 and the lower outer stationary member 34 for receiving the internal output shaft 24 therethrough. When assembled, the recess extending through each of the internal output shaft 24, the upper outer stationary shaft 32, the upper center rotating member 36, the lower center rotating member 38 and the lower outer stationary member 34 are in alignment and the internal output shaft 24 is positioned to extend through the aligned recesses. The first groove 64 extends around a bottom side 66 of the upper center rotating member 36 and the second groove 68 extends around a top side 70 of the lower center rotating member 38. The first, second, third and fourth pistons 40 are received between the first and second grooves 64 and 68, respectively, as is clearly seen in FIGS. 3 and 4. An exhaust port 44 and an intake port 46 extend along a top side of the upper outer stationary member 32 and lower outer stationary member 34. The exhaust port 44 and intake port 46 extend from an outside wall of both the upper outer stationary member 32 and lower outer stationary member 34 towards the recess in the center thereof and the upper and lower center rotating members 36 and 38, respectively. The exhaust port 44 and intake port 46 on the upper outer stationary member 32 is in alignment with the exhaust port 44 and the intake port 46 on the lower outer stationary member 34 when the rotary engine 10 is assembled.

Figure 5:
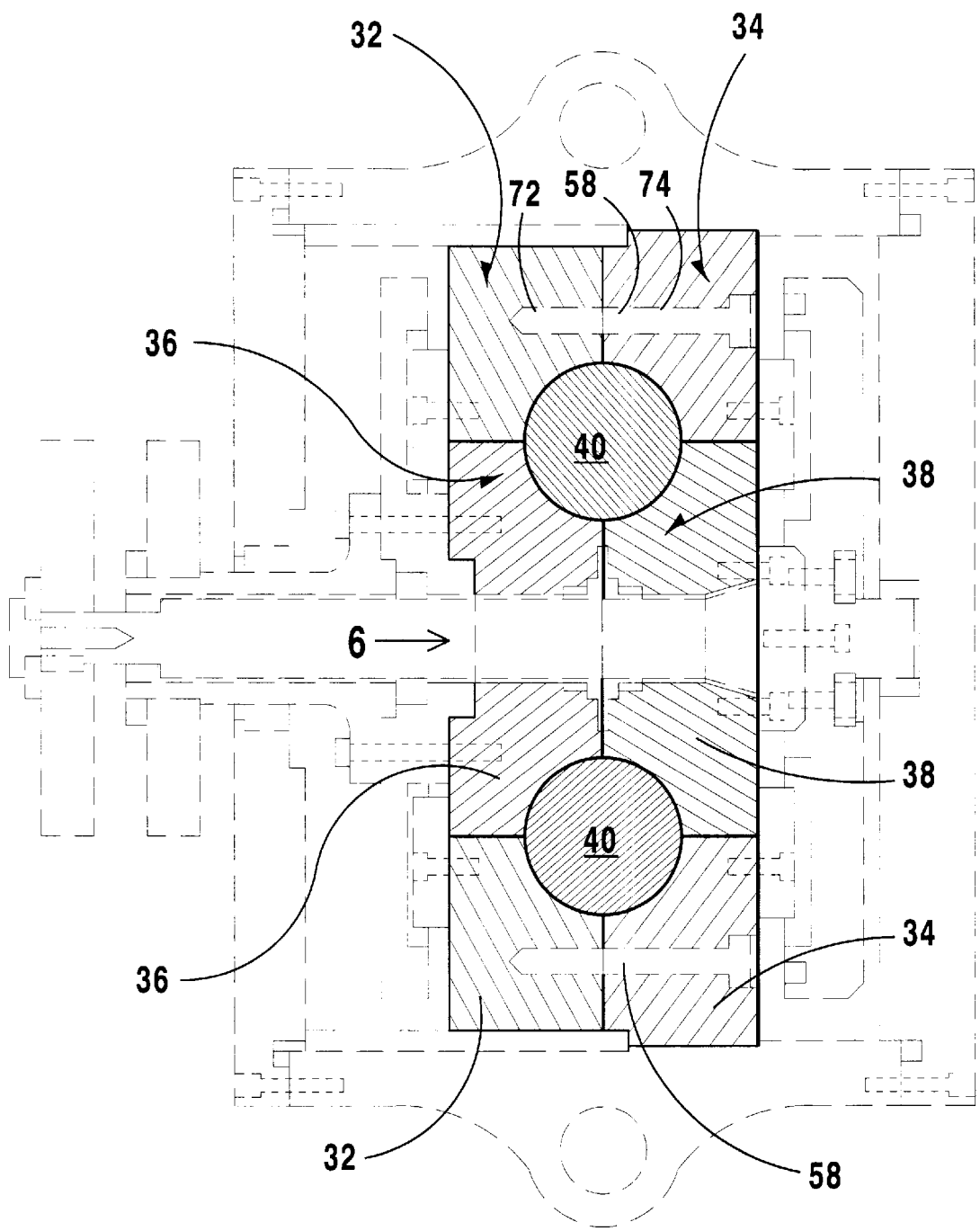
FIG. 5 is a cross-sectional view of the toroidal rotary engine of the present invention taken along the line 5—5 of FIG. 1 illustrating the center rotating members and outer stationary members, all other elements being shown in dashed lines.
Figure 5A:
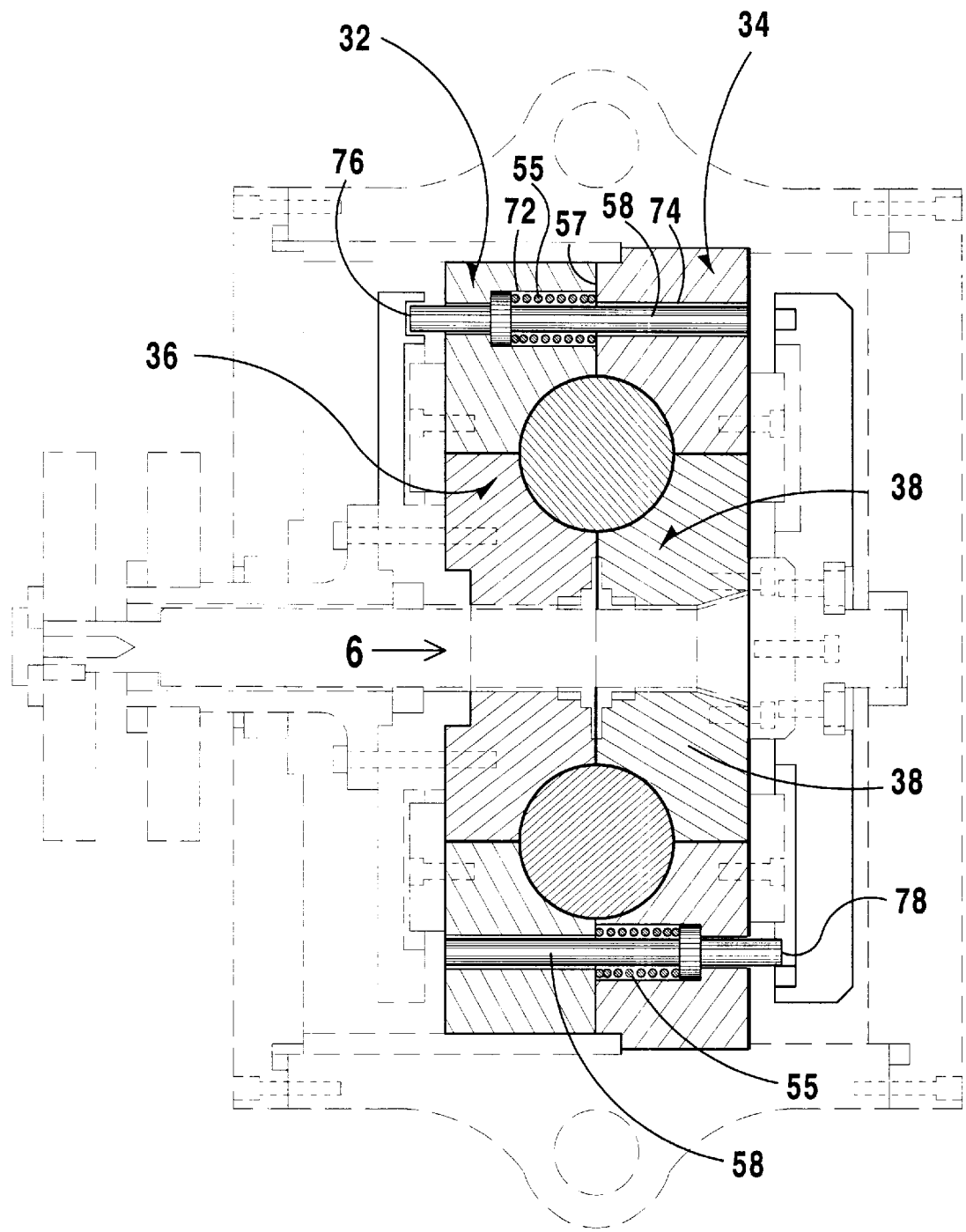
FIG. 5A is a cross-sectional view of the toroidal rotary engine of the present invention taken along the line 5—5 of FIG. 1 illustrating the spring loaded pins.

The positioning of the upper and lower center rotating members 36 and 38, respectively, with respect to the upper and lower outer stationary members 32 and 34, respectively, is illustrated in FIGS. 5 and 5A. As can be seen from this figure, the upper and lower center rotating members 36 and 38 are positioned within a central portion of the upper and lower outer stationary members 32 and 34, respectively. The upper and lower outer stationary members 32 and 34 each also include a groove extending around a periphery thereof for receiving the first, second, third and fourth pistons 40 therein. The pistons 40 are positioned between the upper and lower center rotating members 36 and 38 and upper and lower outer stationary members 32 and 34.

The upper outer stationary member 36 includes at least one recess 72 and the lower outer stationary member 38 also includes at least one recess 74 extending therethrough. The upper and lower outer stationary members 36 and 38 are positioned such that the recesses extending therethrough are in alignment. Extending through the aligned recesses for securing the upper and lower outer stationary members together are spring loaded connecting pins 58. The spring loaded connecting pins 58 extend through the upper and lower outer stationary members 32 and 34 whereby a first end 76 of one of the connecting pins 58 is received by the dynamic upper non-backward mechanism 28 and a second end 78 of a second of the connecting pins 58 is received by the dynamic lower non-backward mechanism 30. A first recess extending through the lower outer stationary member 34 includes a major opening 54 for receiving a spring 55 therein on one side and a minor opening 56 on the opposing end of the recess with a ledge 57 positioned within the recess. The spring 55 is received within the area of the recess between the ledge 57 and the major opening 54 to provide the spring loading for the connecting pin 58. A second recess extending through the lower outer stationary member 34 is of uniform size throughout. The upper stationary member 32 also includes a first recess having a major opening 54 for receiving a spring 55 therein on one side and a minor opening 56 on the opposing end of the recess with a ledge 57 positioned within the recess. The spring 55 is received within the area of the recess between the ledge 57 and the major opening 54 to provide the spring loading for the connecting pin 58. A second recess extending through the upper outer stationary member 32 is of uniform size throughout. The first recess of the lower outer stationary member 34 aligns with the second recess of the upper outer stationary member 32 and the second recess of the lower outer stationary member 34 aligns with the first recess of the upper outer stationary member 32 when the rotary engine 10 is assembled. When assembled, the spring 55 in the first recess of the lower outer stationary member 34 is positioned between the ledge 57 and a top side of the upper stationary member 32 surrounding the second recess extending therethrough and the spring 55 in the first recess of the upper outer stationary member 32 is positioned between the ledge 57 and a top side of the lower stationary member 34 surrounding the second recess extending therethrough. The connecting pins 58 add stability to the dynamic upper and lower non-backward mechanisms 28 and 30.

Figure 11:
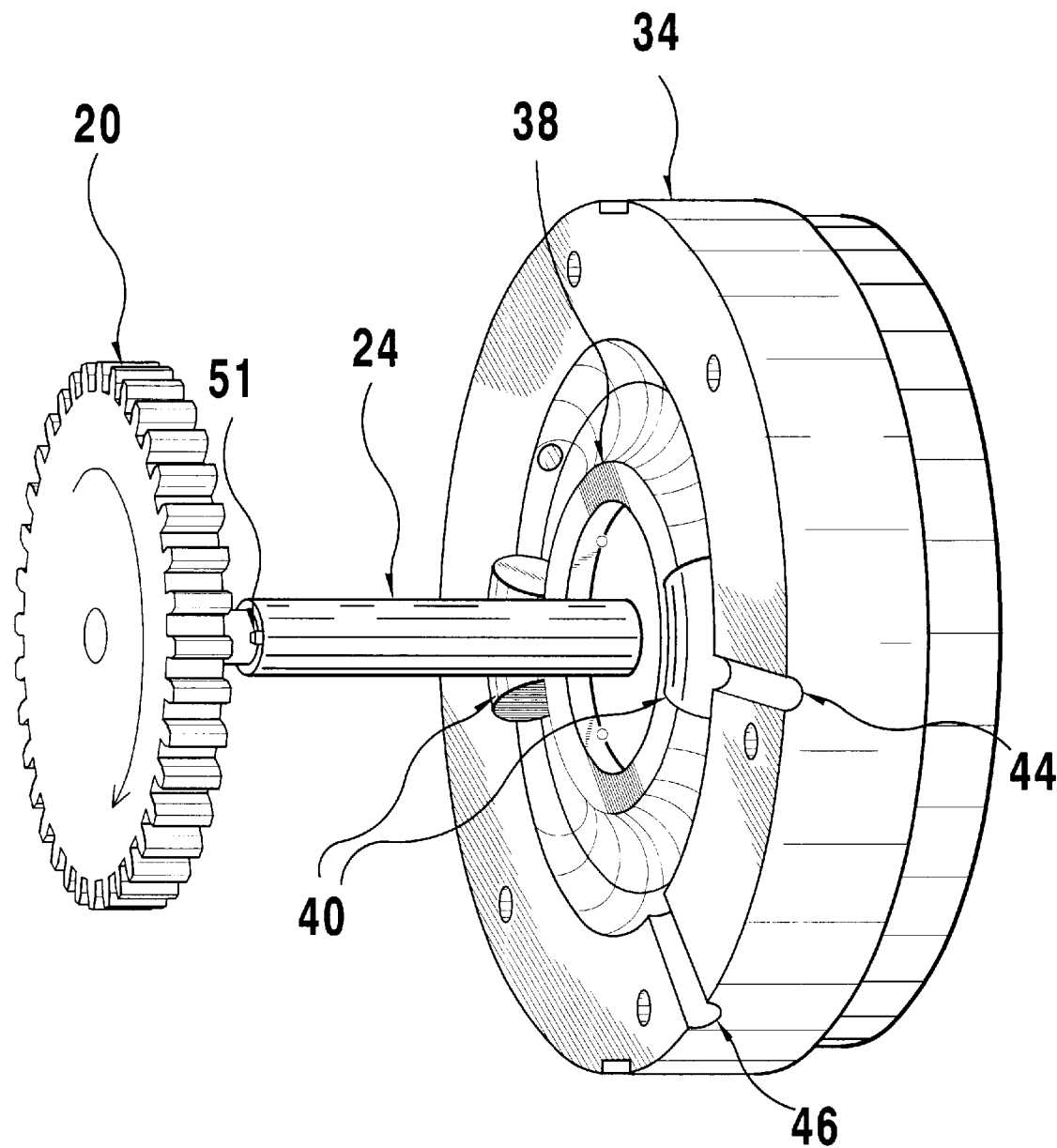
FIG. 11 is a perspective view of the first power train and stationary member of the toroidal rotary engine of the present invention.
Figure 11A:
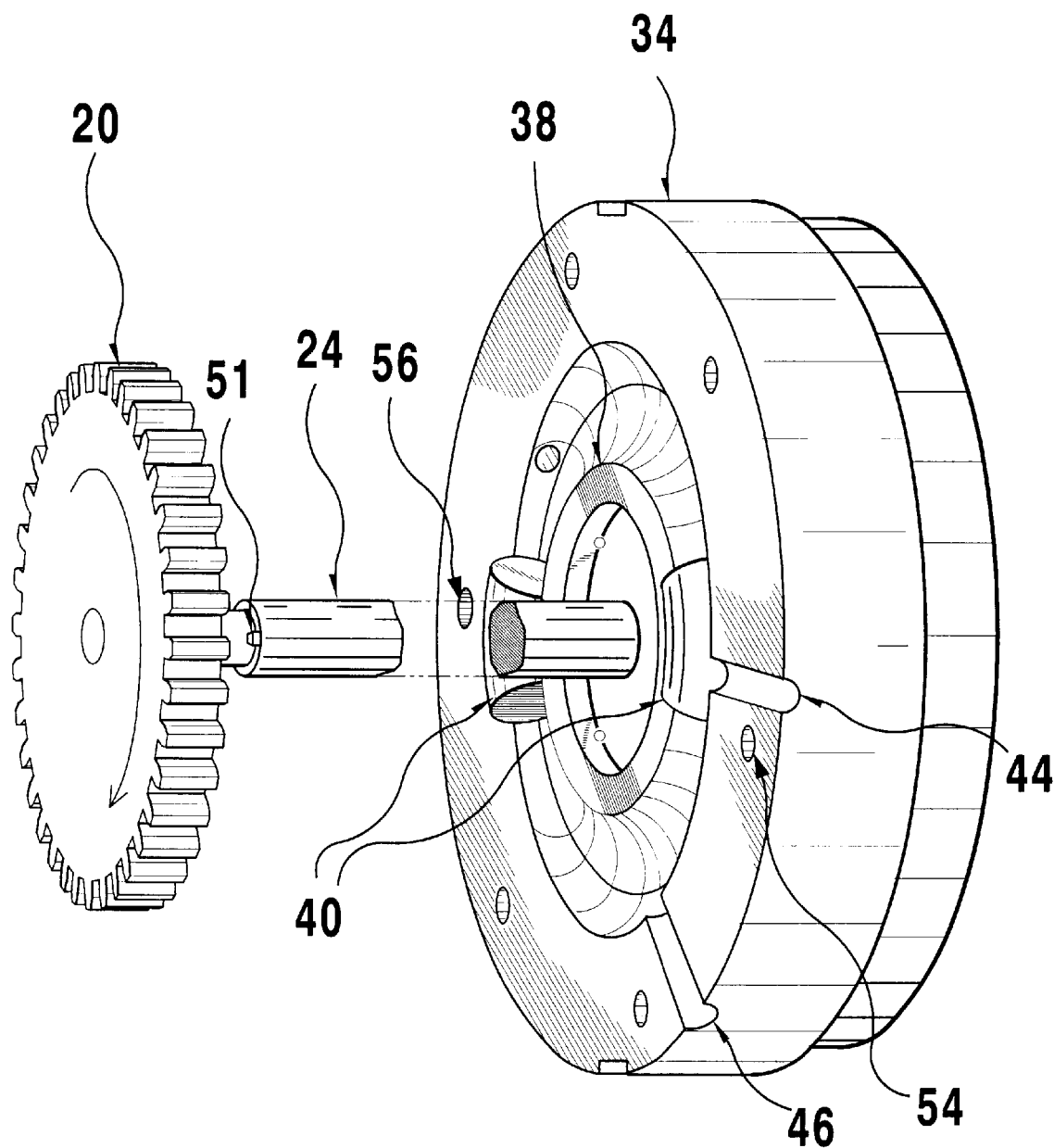
FIG. 11A is a perspective view of the first power train and stationary member of the toroidal rotary engine of the present invention showing the ports for receiving the spring loaded pins.

FIGS. 11 and 11A illustrate the lower center rotating member 38 received within the lower outer stationary member 34. Positioned on the top side 70 of the lower outer stationary member 34 are the exhaust port 44 and an intake port 46. Matching exhaust and intake ports 44 and 46, respectively, are provided on the bottom side of the upper outer stationary member 32 as can be seen in FIG. 6. A cavity 48 is also provided for receiving a spark plug 50 as shown in FIGS. 12A–12D.

Figure 13:
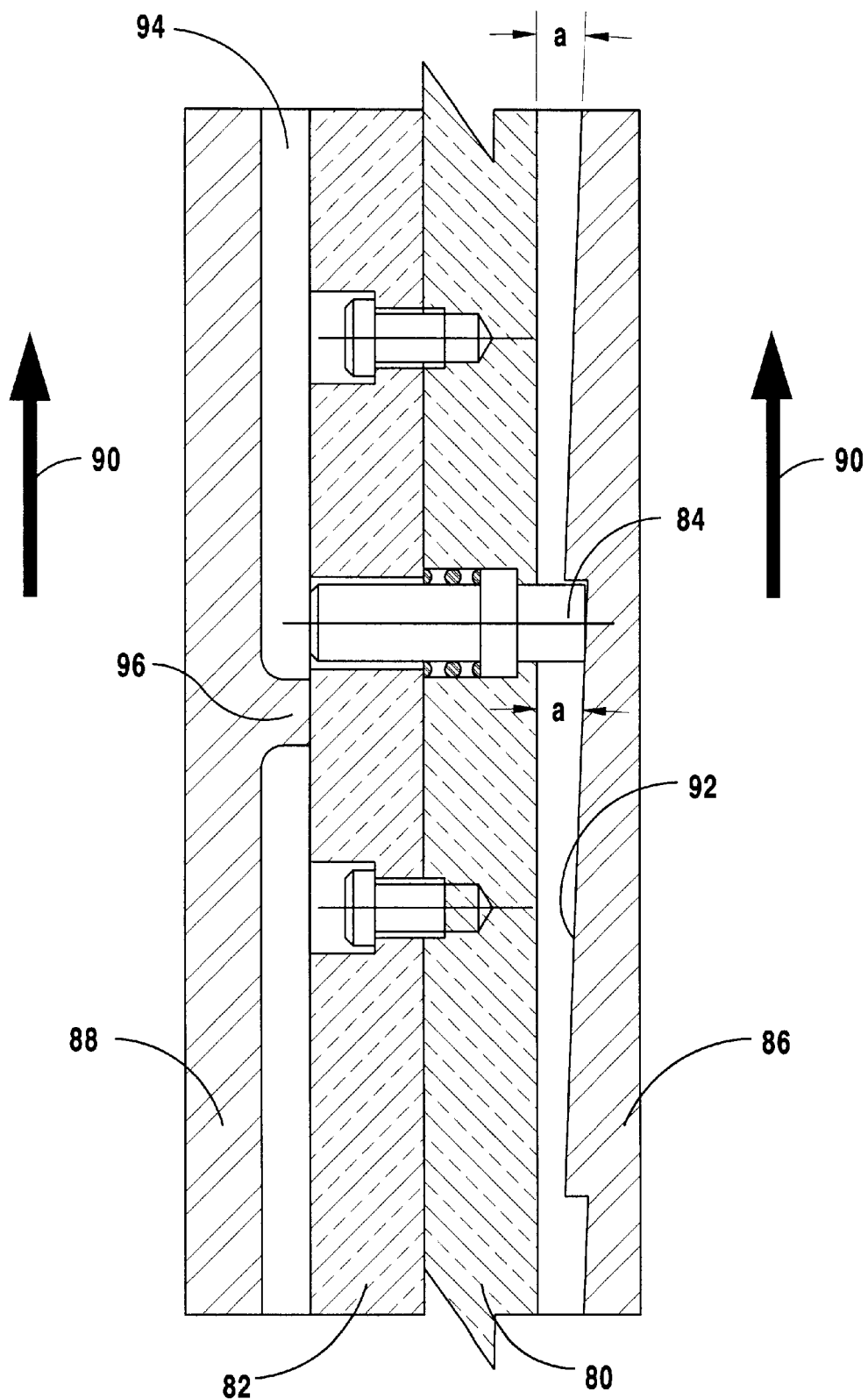
FIG. 13 is a cross-sectional view of the non-backward mechanism of the toroidal rotary engine of the present invention.
Figure 14:
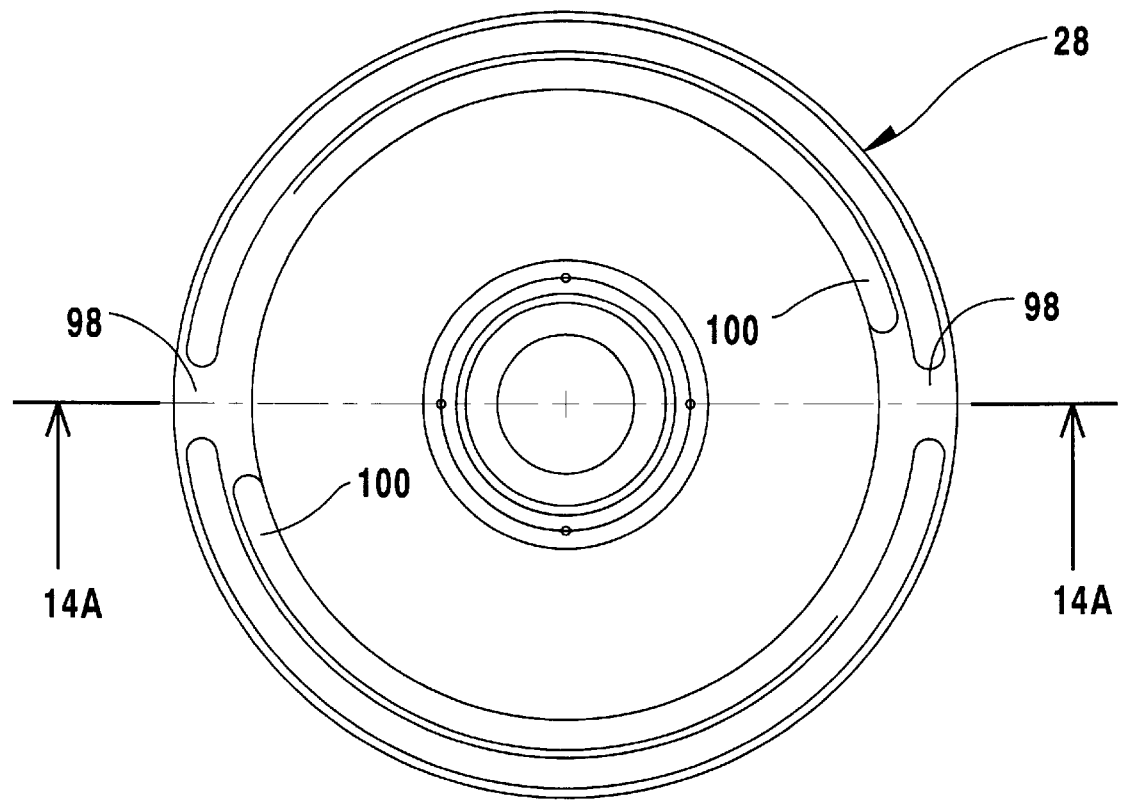
FIG. 14 is a cross-sectional view of the dynamic upper non-backward mechanism of the toroidal rotary engine of the present invention.
Figure 14A:
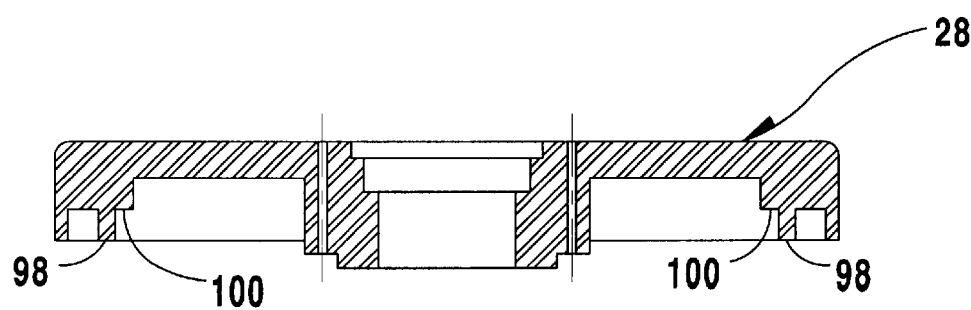
FIG. 14A is a top view of the dynamic upper non-backward mechanism of the toroidal rotary engine of the present invention.
Figure 15:
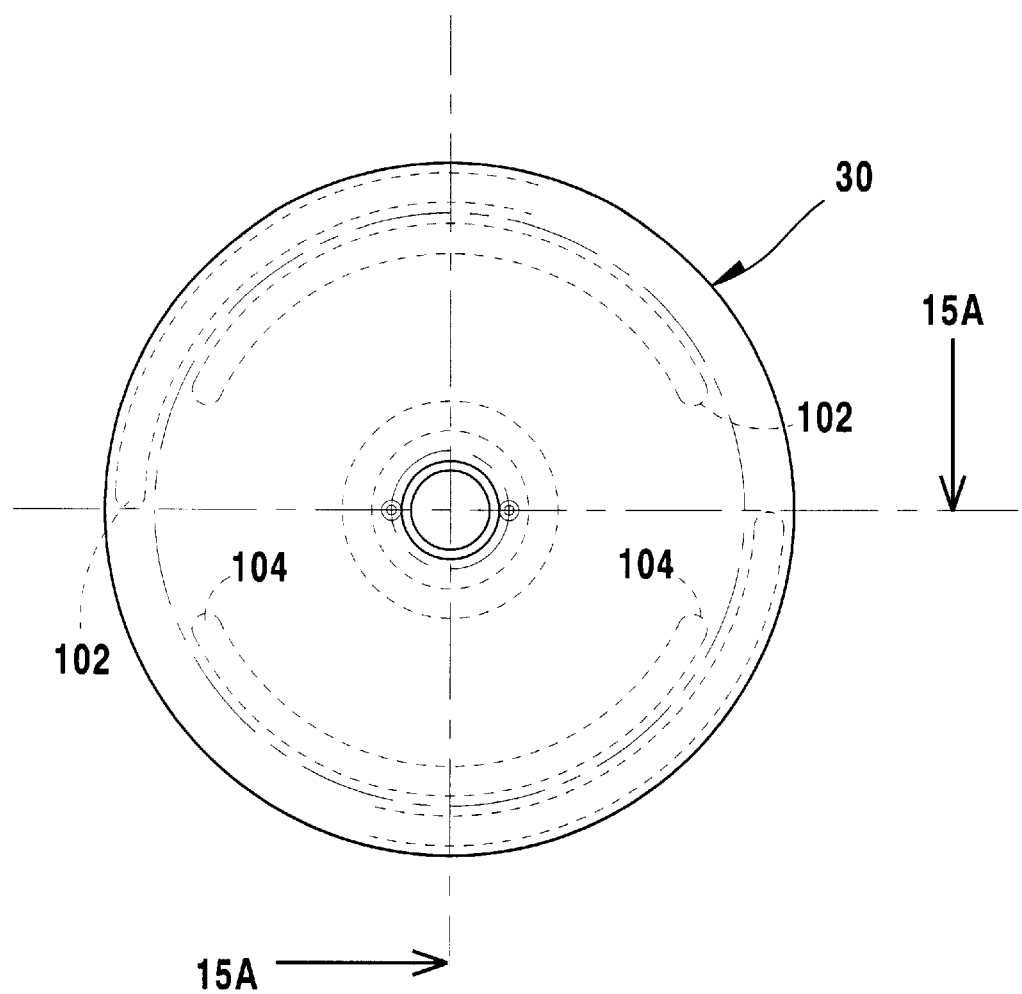
FIG. 15 is a cross-sectional view of the dynamic lower non-backward mechanism of the toroidal rotary engine of the present invention.
Figure 15A:
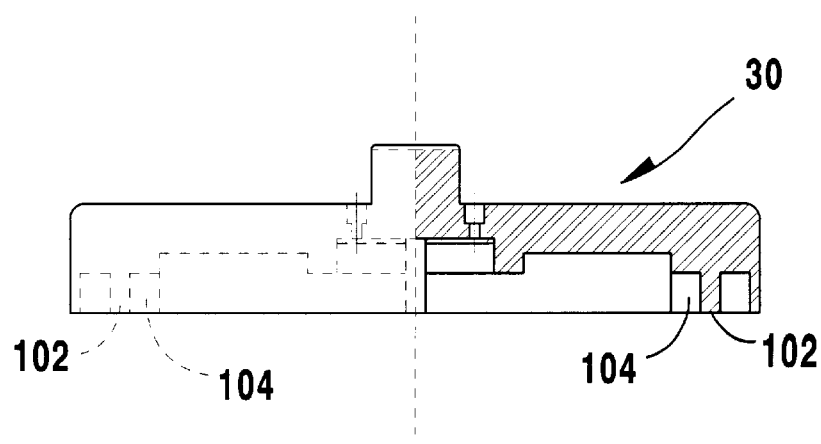
FIG. 15A is a top view of the dynamic lower non-backward mechanism of the toroidal rotary engine of the present invention.

The non-backward mechanism is illustrated in FIG. 13 with the upper non-backward mechanism 28 being illustrated in FIGS. 14 and 14A and the lower non-backward mechanism 30 being illustrated in FIGS. 15 and 15A. The non-backward mechanisms prevent the rotational members from falling into an improper/non functional position. Once a particular position is reached by a rotating member, the non-backward mechanisms will prevent the rotating members from moving back into the previous position as well as ensuring that the chambers will be formed in a perfect sequence to operate correctly. FIG. 13 illustrates a linear model of the upper and lower non-backward mechanisms 28 and 30 to illustrate their operation. FIG. 13 illustrates first and second plates 80 and 82 fixed to one another representing the first and second drive trains. A spring loaded pin 84 is shown engaging a lower plate 86 representing the lower non-backward mechanism 30. An upper plate 88 representing the upper non-backwards mechanism 28 contacts the second plate 82. Both the upper and lower plates 86 and 88 are able to move in the direction of the arrows labeled with the numeral 90. The spring loaded pin 84 is free to move perpendicular to the lower and upper plates 86 and 88. The lower plate 86 includes a saw-toothed top side 92 applying a force on the spring loaded pin 84 towards the upper plate 88 when the lower plate 86 moves in the direction of arrow 90. The upper plate 88 includes a channel 94 for receiving the spring loaded pin 84 and a protrusion 96 for limiting the movement of the spring loaded pin 84. As the lower plate 86 moves in the direction of the arrow 90, the pin 84 will ride up one sawtooth of the top side 92 and eventually contact the protrusion 96. Upon reaching the ledge defining the top of the sawtooth, the pin 84 will drop over the ledge and be compressed in order to pass by the protrusion 96 and move into a channel 98 on the other side of the protrusion 96. Once past the protrusion 96, the pin 84 will be prevented from returning to the channel it has left and thus returning to its previous position. This operation will continue for as long as the upper and lower plates 86 and 88 continue to rotate. A top and side view of the upper non-backwards mechanism 28 is illustrated in FIGS. 14 and 14A. A top and side view of the lower non-backwards mechanism 30 is illustrated in FIGS. 15 and 15A. These figures illustrate the grooves for a four cycle, four piston engine. The upper non-backwards mechanism 28 includes protrusions 98 and sawteeth 100 and the lower non-backwards mechanism 30 includes protrusions 102 and sawteeth 104.

While a preferred structure for the non-backward mechanism is shown and described herein, those of ordinary skill in the art who have read this description will appreciate that there are numerous other structures for the non-backward mechanism and, therefore, as used herein the phrase "means for preventing the first and second drive trains from returning to a previous position" should be construed as including all such structures as long as they achieve the desired result of preventing the first and second drive trains from returning to a previous position, and therefore, that all such alternative mechanisms are to be considered as equivalent to the one described herein.

The operation of the rotary engine 10 will now be described with reference to the figures and specifically FIGS. 12A–12D which show a complete cycle of the engine. Shown in the figures are the four pistons 40, four sealed chambers formed by the spacing of the four pistons 40 and the interaction of the pistons with three static elements, i.e. the exhaust port 44, the intake port 46 and the spark plug 50.

Figure 12A:
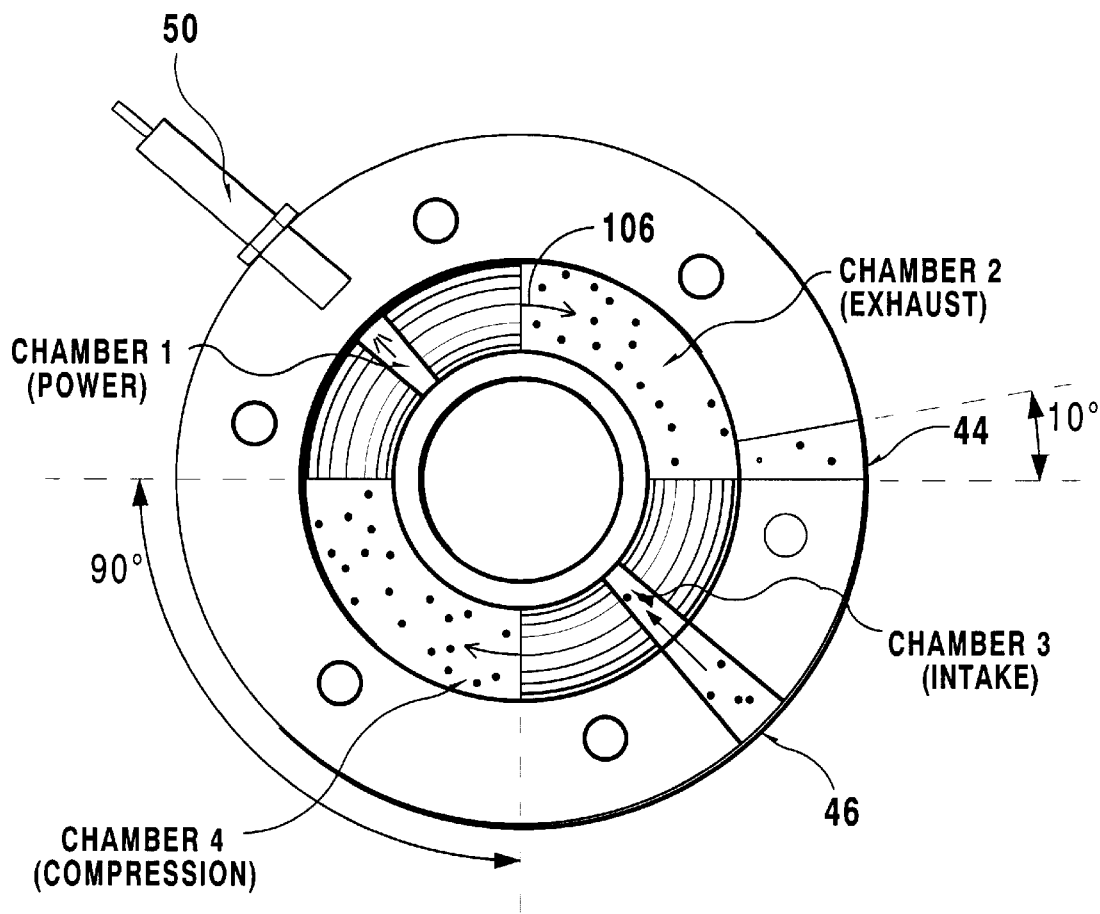
FIG. 12A is a diagrammatic view of the position of the first chamber during the intake cycle.

The beginning of the cycle is illustrated in FIG. 12A. The pistons are labeled A, B, C and D and the four chambers formed thereby are labeled 1, 2, 3 and 4 for case of explanation. Opposing pistons A and C belong to the first power train and opposing pistons B and D belong to the second power train. The engine 10 will rotate in a clockwise direction. Each of the pistons A, B, C and D have an angular size of 40°, the angular size of the exhaust port 44 and intake port 46 is 10°. Chambers 2 and 4 have an initial angular size of 90° and chambers 1 and 3 have an initial angular size of 10°. Chamber 1 contains a compressed mixture of air and fuel, chamber 2 contains low pressure exhaust gasses and communicates with the exhaust port 44, chamber 3 contains low-pressure exhaust gasses and communicates with the intake port 46 and chamber 4 contains a low-pressure mixture of air and fuel and is hermetically sealed.

To start the engine, a spark plug 50 ignites the compressed air and fuel mixture in chamber 1 which quickly burns the air and fuel mixture therein applying a pressure to pistons A and D. Piston D is prevented from moving due to the non-backwards mechanism and thus piston A is forced to move in a clockwise direction as indicated by the arrow labeled with the numeral 106. As piston B belongs to the same power train as piston D, piston B is prevented from moving. As piston C belongs to the same power train as piston A, piston C will move with piston A in a clockwise direction.

Figure 12B:
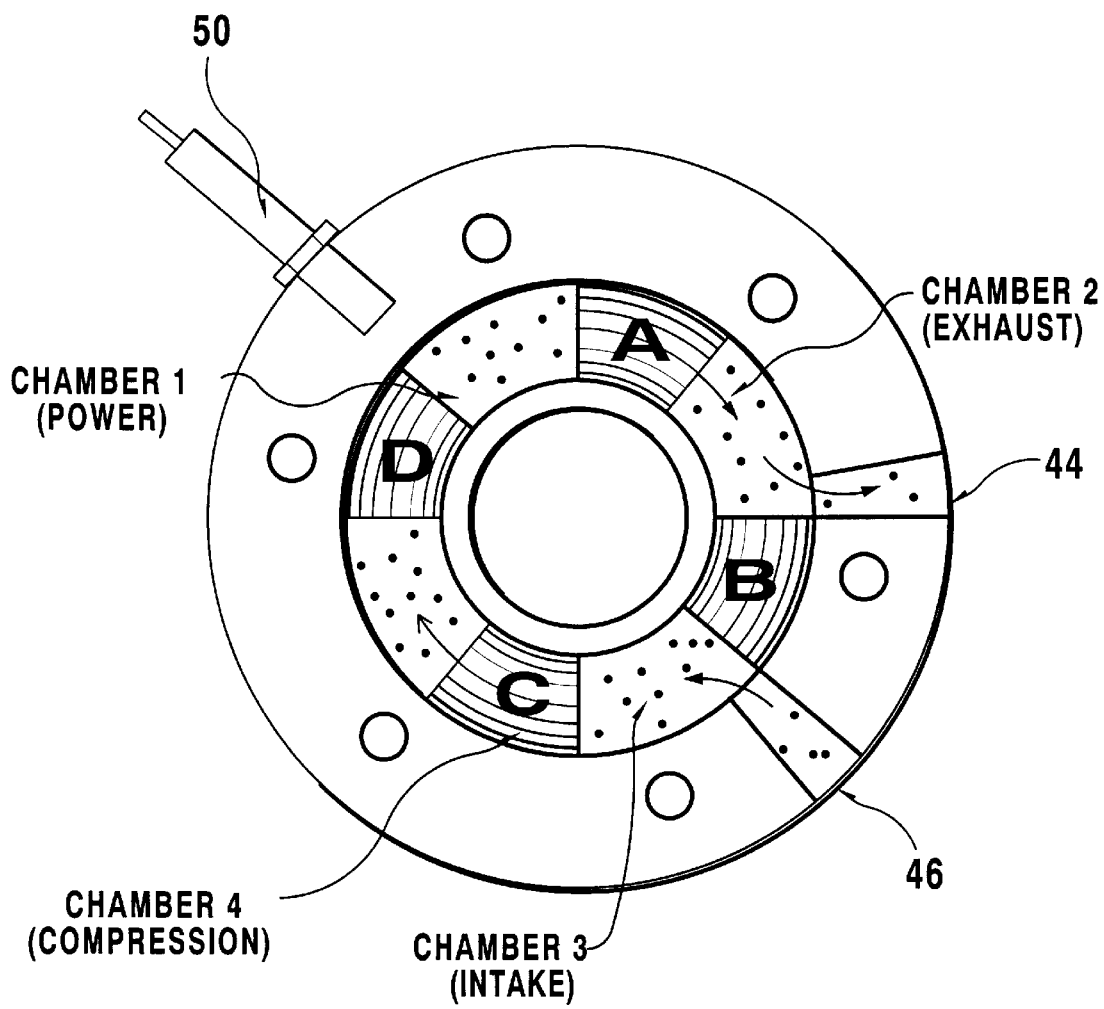
FIG. 12B is a diagrammatic view of the position of the first chamber during compression of the fuel air mixture.

As can be seen from FIG. 12B, chamber 1 has increased in size along with chamber 3 while chambers 2 and 4 have had a proportional decrease in size. As chamber 2 contracts, the low pressure exhaust gasses therein are caused to flow through the exhaust port 44. As chamber 3 expands, a suction is created drawing a fresh mixture of air and fuel in through the intake port 46. The expansion of chamber 3 causes chamber 4 to contract thereby compressing the air-fuel mixture therein and greatly increasing the power that can be extracted therefrom. As pistons A and C move clockwise, the internal output shaft 24 is caused to rotate thereby rotating the upper external gear 20.

Figure 12C:
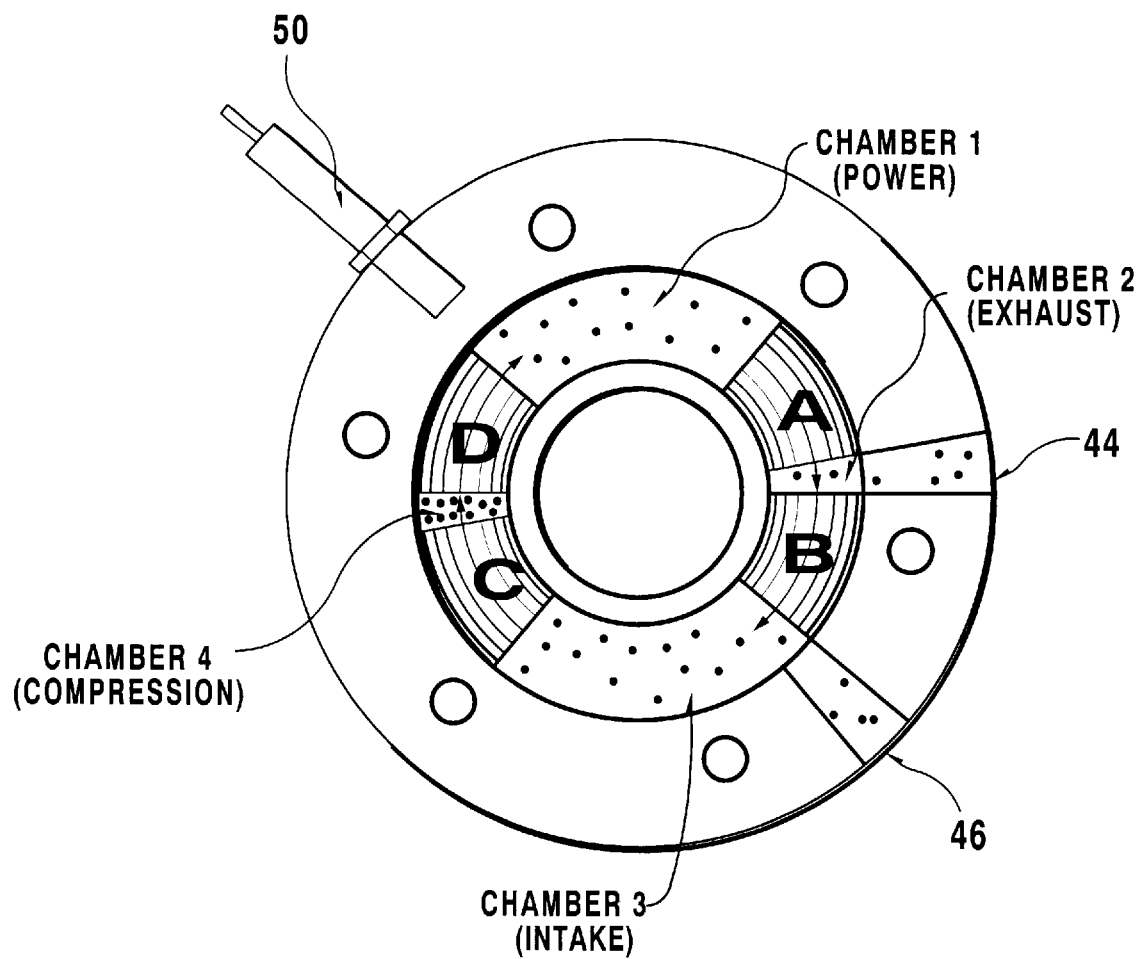
FIG. 12C is a diagrammatic view of the position of the first chamber during the combustion cycle.

FIG. 12C illustrates the operation of the engine once chambers I and 3 reach an angular size of 90°. At this point, chambers 2 and 4 reach an angular size of 10°. The internal shaft angular stop 51 contacts the output shaft angular stop 52 at this point preventing further rotation of the first power train and preventing the size of the chambers from changing further.

Figure 12D:
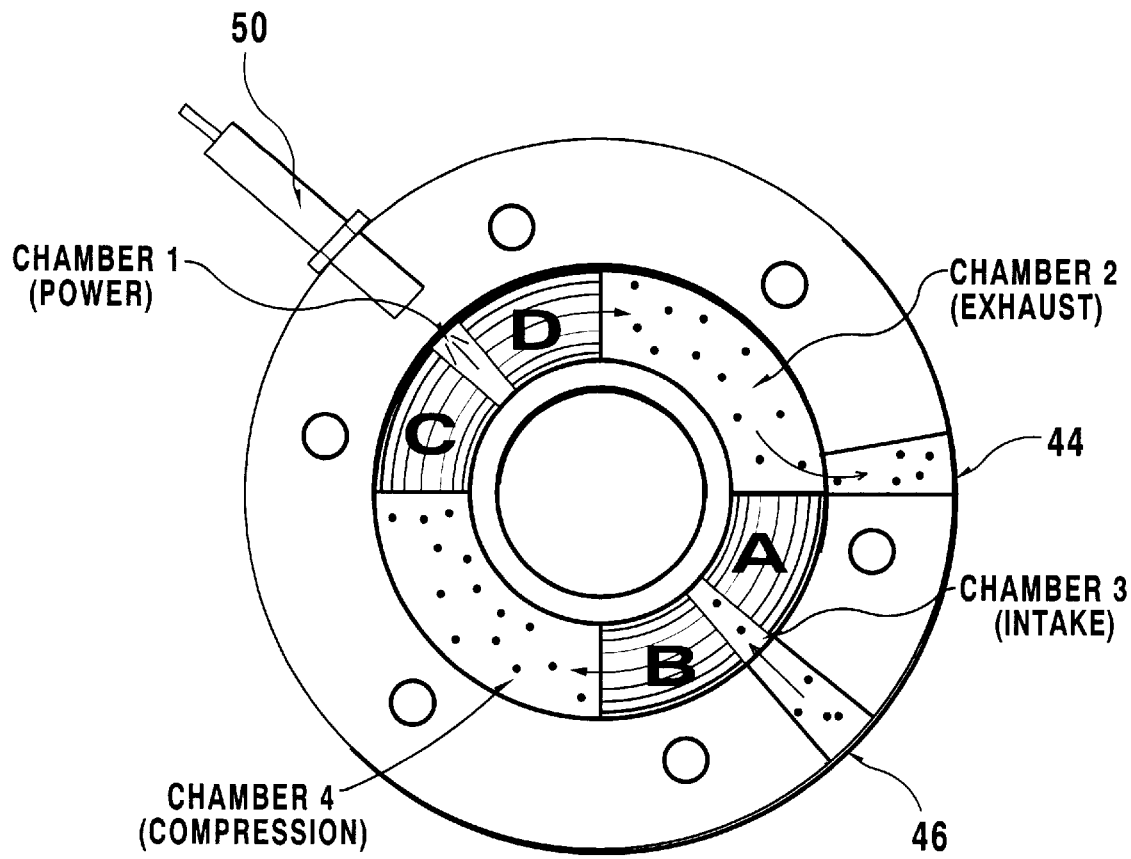
FIG. 12D is a diagrammatic view of the position of the first chamber during the exhaust cycle.

At this point, the chambers have rotated to move one position ahead such that chambers 1, 2, 3 and 4 now occupy the positions previously held by chambers 2, 3, 4 and 1 respectively as is illustrated in FIG. 12D. Chamber 1 now contains low-pressure burned gas that will flow through the exhaust port 44 as the chamber contracts. Chamber 2 includes low-pressure exhaust gas and will be filled with a fresh mixture of air and fuel from the intake port 46 as the chamber expands. Chamber 3 includes a low-pressure fuel-air mixture which will be compressed as the chamber contracts and chamber 4 includes an already compressed air-fuel mixture that will be ignited by the spark plug and burn. Upon ignition of the spark plug 50, pistons A and C will be forced to remain in position by the action of the pressure and non-backward mechanism. Pistons B and D will be forced to move clockwise by the increasing pressure in chamber 4 caused by the burning of the air-fuel mixture. The movement of pistons B and D causes the second power train to rotate causing the external shaft 26 to apply a rotational force to the lower external gear 22. Rotation of the external output shaft 26 and the lower external gear 22 will cease upon contacting of the angular stops 51 and 52. This sequential movement of the first and second power trains will continue with the first and second power trains prevented from moving in a counterclockwise direction.

From the above description it can be seen that the rotary engine of the present invention is able to overcome the shortcomings of prior art devices by providing a rotary engine which is smaller, lighter, more completely free of vibration, cheaper, and mechanically simpler than the reciprocating linear internal-combustion engine. The toroidal rotary engine including a simple control mechanism, an acceptable sealing of the sliding surfaces involved, and a reliable and simple connection between the toroidal pistons and output shaft. The toroidal rotary engine also allows the fitness of a two or a four-stroke cycle with a spark-ignition or a compression-ignition system. Furthermore, the rotary engine of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rotary engine comprising:
   a) a static toroidal cavity including:
      i) an inlet port for introducing fuel and air to said cavity; and
      ii) an outlet port for exhausting products of combustion from said cavity;
   b) a first power train able to rotate in a first direction within said static cavity, said first power train including a first output shaft;
   c) a second power train able to rotate in said first direction within said static cavity, said second power train including a second output shaft;
   d) a plurality of pistons positioned around a perimeter of said toroidal cavity and between said first and second power trains, said plurality of pistons being movable with respect to said cavity, said plurality of pistons including a first set of pistons connected to rotate with said first power train and a second set of pistons connected to rotate with said second power train and defining a plurality of chambers therebetween said plurality of pistons, wherein combustion of a fuel air mixture within a first one of said plurality of chambers causes a fuel gas mixture to be introduced into a second one of said plurality of chambers through said intake port, combustion material to be exhausted from a third one of said plurality of chambers and one of said first and second drive trains to rotate in said first direction, wherein a subsequent combustion of a fuel air mixture in one of said plurality of chambers causes the other of said first and second drive trains to rotate in said first direction, said first and second drive trains alternating movement upon subsequent combustions;
   e) said first and second drive trains further including means for stopping movement of the first and second drive trains thereby controlling the amount of rotation of said first and second drive trains and a maximum and minimum angular size of each of said plurality of chambers.

2. The rotary engine as recited in claim 1, further comprising means for introducing lubricant to said pistons for cooling said engine and minimizing friction encountered by movement of said pistons.

3. The rotary engine as recited in claim 1, further comprising means for preventing the first and second drive trains from returning to a previous position after rotation of either of said first and second drive trains.

4. The rotary engine as recited in claim 1, wherein first output shaft includes a gear connected to rotate therewith, said first gear being located outside said cavity.

5. The rotary engine as recited in claim 1, wherein said second output shaft includes a second gear connected to rotate therewith, said second gear being located outside said cavity.

6. The rotary engine as recited in claim 1, wherein said first drive train includes a first internal rotating member including a first groove extending around a top side thereof for receiving said plurality of pistons therein.

7. The rotary engine as recited in claim 6, wherein said second drive train includes a second internal rotating member including a second groove extending around a bottom side thereof for mating with said first groove and receiving said plurality of pistons therebetween.

8. The rotary engine as recited in claim 7, further comprising a first outer stationary member for receiving said first inner rotating member therein and a second outer stationary member for receiving said second inner rotating member therein, said first and second outer stationary members providing stabilization for said first and second inner rotating members.

9. The rotary engine as recited in claim 8, wherein said first outer stationary member includes a third groove on a top side thereof and said second outer stationary member includes a fourth groove on a bottom side thereof, said third and fourth grooves aiding said first and second grooves in retaining said plurality of pistons in position.

10. The rotary engine as recited in claim 1, wherein said means for stopping includes a first angular stop extending from said first output shaft and a second angular stop extending from said second output shaft, wherein said first and second drive trains are caused to cease movement when said first and second angular stops engage one another.

11. The rotary engine as recited in claim 1, wherein said cavity further includes means for receiving a spark plug, whereby said spark plug causes said combustion upon ignition thereof.

12. The rotary engine as recited in claim 11, wherein ignition of said spark plug is timed to regulate movement of said first and second drive trains.

13. A rotary engine comprising:
   a) a static toroidal cavity including:
      i) an inlet port for introducing fuel and air to said cavity; and
      ii) an outlet port for exhausting products of combustion from said cavity;
   b) a first power train able to rotate in a first direction within said static cavity, said first power train including a first output shaft;
   c) a second power train able to rotate in said first direction within said static cavity, said second power train including a second output shaft;
   d) a plurality of pistons positioned around a perimeter of said toroidal cavity and between said first and second power trains, said plurality of pistons being movable with respect to said cavity, said plurality of pistons including a first set of pistons connected to rotate with said first power train and a second set of pistons connected to rotate with said second power train and defining a plurality of chambers therebetween said plurality of pistons, wherein combustion of a fuel air mixture within a first one of said plurality of chambers causes a fuel gas mixture to be introduced into a second one of said plurality of chambers through said intake port, combustion material to be exhausted from a third one of said plurality of chambers and one of said first and second drive trains to rotate in said first direction, wherein a subsequent combustion of a fuel air mixture in one of said plurality of chambers causes the other of said first and second drive trains to rotate in said first direction, said first and second drive trains alternating movement upon subsequent combustions;

e) said first drive train including a first internal rotating member including a first groove extending around a top side thereof for receiving said plurality of pistons therein;

f) said second drive train including a second internal rotating member including a second groove extending around a bottom side thereof for mating with said first groove and receiving said plurality of pistons therebetween;

g) said first and second inner rotating members being connected by a spring loaded pin.

* * * * *